US010520066B2

(12) United States Patent
Walter et al.

(10) Patent No.: US 10,520,066 B2
(45) Date of Patent: Dec. 31, 2019

(54) ORBITAL TENSIONER ASSEMBLY

(71) Applicant: Litens Automotive Partnership, Woodbridge (CA)

(72) Inventors: Ingo Walter, Grundau (DE); Michael B. Fischer, Fellen (DE); Elvis Becirovic, Offenbach am Main (DE)

(73) Assignee: Litens Automotive Partnership, Woodbridge (CA)

( * ) Notice: Subject to any disclaimer, the term of this patent is extended or adjusted under 35 U.S.C. 154(b) by 362 days.

(21) Appl. No.: 15/322,097

(22) PCT Filed: Jun. 26, 2014

(86) PCT No.: PCT/CA2014/000520
§ 371 (c)(1),
(2) Date: Dec. 23, 2016

(87) PCT Pub. No.: WO2015/196268
PCT Pub. Date: Dec. 30, 2015

(65) Prior Publication Data
US 2017/0146100 A1 May 25, 2017

(51) Int. Cl.
*F16H 7/12* (2006.01)
*F02B 67/06* (2006.01)
*F16H 7/08* (2006.01)

(52) U.S. Cl.
CPC ........... *F16H 7/1218* (2013.01); *F02B 67/06* (2013.01); *F16H 2007/081* (2013.01);
(Continued)

(58) Field of Classification Search
CPC ........... F16H 2007/0874; F16H 7/1281; F16H 2007/081; F16H 2007/0893; F02B 67/06
(Continued)

(56) References Cited

U.S. PATENT DOCUMENTS 315,735 A 4/1885 Golburn
611,170 A * 9/1898 Howard ............... F16H 7/1281
474/134
(Continued)

FOREIGN PATENT DOCUMENTS

CN 1495375 A 5/2004
CN 1516789 A 7/2004
(Continued)

OTHER PUBLICATIONS

Office Action for CN201580056579.6 dated Nov. 21, 2018.
Office Action for CN201580056579.6 dated Nov. 21, 2018—English translation.
Official Communication for EP15852865 dated Dec. 29, 2018.
Extended European Search Report dated Jun. 20, 2018.
Office Action for CN201480080094.6 dated Jun. 5, 2018.
(Continued)

*Primary Examiner* — Henry Y Liu
(74) *Attorney, Agent, or Firm* — Millman IP Inc.

(57) ABSTRACT

In an aspect, a tensioner is provided for tensioning an endless drive member that is engaged with a rotary drive member on a shaft of a motive device. The tensioner includes a base that is mountable to the motive device, a ring that is rotatably supported by the base in surrounding relationship with the shaft of the motive device and which is rotatable about a ring axis, a tensioner arm pivotally mounted to the ring for pivotal movement about an arm pivot axis, and first and second tensioner pulleys. The first tensioner pulley is rotatably mounted to the tensioner arm. The tensioner arm is biased towards a first span of the endless drive member on one side of the rotary drive member. The second tensioner pulley is rotatably mounted at least indirectly to the ring and is biased towards a second span of the endless drive member on another side of the rotary drive member. The ring is rotatable in response to hub loads in the first and second tensioner pulleys that result from engagement with the first and second spans of the endless drive member.

16 Claims, 28 Drawing Sheets

(52) U.S. Cl.
CPC ............... *F16H 2007/0806* (2013.01); *F16H 2007/0865* (2013.01); *F16H 2007/0874* (2013.01); *F16H 2007/0893* (2013.01)

(58) Field of Classification Search
USPC ....................................................... 474/134
See application file for complete search history.

(56) References Cited

U.S. PATENT DOCUMENTS

| | | | |
|---|---|---|---|
| 1,220,304 A | 3/1917 | Welffens | |
| 1,257,660 A | 2/1918 | Willis | |
| 1,433,958 A | 10/1922 | Laughton | |
| 1,805,326 A | 5/1931 | Bunker | |
| 2,425,476 A | 8/1947 | Lade | |
| 2,588,880 A | 3/1952 | Richards | |
| 2,954,726 A | 10/1960 | Norman et al. | |
| 3,575,058 A | 4/1971 | Kraus | |
| 4,564,098 A | 1/1986 | Hormann | |
| 4,758,208 A | 7/1988 | Bartos et al. | |
| 5,083,983 A * | 1/1992 | Hirai | F16H 7/1218 474/135 |
| 5,139,463 A | 8/1992 | Byztek et al. | |
| RE34,616 E | 5/1994 | Komorowski et al. | |
| 5,598,913 A | 2/1997 | Monahan et al. | |
| 5,722,909 A | 3/1998 | Thomey et al. | |
| 5,725,450 A | 3/1998 | Huskey | |
| 5,776,025 A * | 7/1998 | Labudde | F16H 7/1281 474/133 |
| 6,511,393 B1 | 1/2003 | Bogl | |
| 6,609,989 B2 | 8/2003 | Bogner et al. | |
| 6,648,783 B1 * | 11/2003 | Bogner | F16H 7/1281 474/134 |
| 6,652,401 B2 | 11/2003 | Liu | |
| 6,689,001 B2 | 2/2004 | Oliver | |
| 6,857,978 B2 | 2/2005 | Polster et al. | |
| 6,863,631 B2 | 3/2005 | Meckstroth et al. | |
| 6,942,589 B2 | 9/2005 | Rogers | |
| 6,957,979 B2 | 10/2005 | Welsh et al. | |
| 6,960,145 B2 | 11/2005 | Fraley, Jr. | |
| 7,285,065 B2 | 10/2007 | Dinca | |
| 7,419,447 B2 | 9/2008 | Serkh | |
| 7,468,013 B2 | 12/2008 | Di Giacomo et al. | |
| 7,494,434 B2 | 2/2009 | McVicar | |
| 7,892,125 B2 | 2/2011 | Nelson | |
| 7,901,310 B2 | 3/2011 | Lolli | |
| 7,975,821 B2 | 7/2011 | Antchak et al. | |
| 8,092,328 B2 | 6/2012 | Dec et al. | |
| 8,353,795 B2 | 1/2013 | Montani | |
| 8,439,780 B2 * | 5/2013 | Ruffini | F16H 7/1281 474/112 |
| 8,821,328 B2 | 9/2014 | Jud et al. | |
| 9,140,338 B2 * | 9/2015 | Serkh | F16H 7/1218 |
| 2003/0098214 A1 | 5/2003 | Titus et al. | |
| 2003/0109342 A1 | 6/2003 | Oliver | |
| 2003/0216203 A1 | 11/2003 | Oliver | |
| 2003/0220164 A1 | 11/2003 | Tamai | |
| 2004/0043854 A1 | 3/2004 | Fraley, Jr. | |
| 2006/0100051 A1 | 5/2006 | Di Giacomo | |
| 2006/0217222 A1 * | 9/2006 | Lolli | F16H 7/1281 474/134 |
| 2006/0287146 A1 * | 12/2006 | McVicar | F16H 7/1281 474/109 |
| 2007/0037648 A1 | 2/2007 | Di Giacomo | |
| 2007/0240964 A1 | 10/2007 | Saito et al. | |
| 2008/0007073 A1 | 1/2008 | Geller | |
| 2008/0214342 A1 | 9/2008 | Montani | |
| 2009/0176583 A1 | 7/2009 | Dell et al. | |
| 2009/0298631 A1 * | 12/2009 | Jud | F16H 7/1281 474/237 |
| 2011/0070985 A1 * | 3/2011 | Deneszczuk | F16H 7/1281 474/135 |
| 2011/0070986 A1 * | 3/2011 | Maguire | F02B 67/06 474/135 |
| 2011/0281676 A1 | 11/2011 | Trappolini | |
| 2012/0010034 A1 | 1/2012 | Gilmer | |
| 2012/0028744 A1 | 2/2012 | Hartmann | |
| 2012/0058847 A1 | 3/2012 | Ferguson | |
| 2012/0115657 A1 | 5/2012 | Antchak | |
| 2012/0178563 A1 | 6/2012 | Lee et al. | |
| 2012/0318589 A1 | 12/2012 | Staley et al. | |
| 2013/0040770 A1 * | 2/2013 | Wolf | F16H 7/1281 474/134 |
| 2013/0079185 A1 | 3/2013 | Schauerte et al. | |
| 2013/0095967 A1 * | 4/2013 | Wolf | F16H 7/1281 474/135 |
| 2013/0203535 A1 * | 8/2013 | Mack | F16H 7/1281 474/134 |
| 2013/0237351 A1 | 9/2013 | Marion | |
| 2013/0260932 A1 * | 10/2013 | Adam | F16H 7/1218 474/134 |
| 2013/0284139 A1 * | 10/2013 | Staley | F02N 15/08 123/179.25 |
| 2014/0256488 A1 * | 9/2014 | Wolf | F16H 7/1281 474/135 |
| 2014/0315673 A1 * | 10/2014 | Zacker | F16H 7/1218 474/135 |
| 2015/0060232 A1 | 3/2015 | Tran et al. | |
| 2015/0300462 A1 * | 10/2015 | Serkh | F16H 7/1218 474/112 |
| 2015/0308545 A1 * | 10/2015 | Harvey | F16H 7/1218 474/117 |
| 2015/0345597 A1 * | 12/2015 | Walter | F16H 7/1218 474/134 |
| 2015/0369347 A1 * | 12/2015 | Wolf | F16H 7/1281 474/134 |
| 2016/0146312 A1 * | 5/2016 | Pfeifer | F16H 7/08 474/135 |
| 2018/0010670 A1 * | 1/2018 | Leucht | F16H 7/0838 |
| 2018/0172117 A1 * | 6/2018 | Arneth | F02B 67/06 |
| 2018/0202521 A1 * | 7/2018 | Reuschel | F16H 7/1218 |
| 2018/0298995 A1 * | 10/2018 | Reuschel | F02B 67/06 |
| 2018/0320765 A1 * | 11/2018 | Hauck | F02B 67/06 |

FOREIGN PATENT DOCUMENTS

| | | |
|---|---|---|
| CN | 101147012 A | 3/2008 |
| CN | 101666369 A | 3/2010 |
| CN | 102954167 A | 3/2013 |
| CN | 103062346 A | 4/2013 |
| CN | 104033552 A | 9/2014 |
| CN | 104884842 A | 9/2015 |
| DE | 1226850 B | 4/1967 |
| DE | 1227302 B | 5/1967 |
| DE | 1575619 A1 | 1/1970 |
| DE | 339821 A1 | 6/1991 |
| DE | 3939821 A1 | 6/1991 |
| DE | 69218428 | 12/1992 |
| DE | 69218428 D1 | 12/1992 |
| DE | 4243451 A1 | 6/1994 |
| DE | 19849886 A1 | 5/2000 |
| DE | 19926612 A1 | 12/2000 |
| DE | 19926615 A1 | 12/2000 |
| DE | 102005039719 A1 | 3/2007 |
| DE | 102006019877 A1 | 10/2007 |
| DE | 202008002279 U1 | 6/2008 |
| DE | 102007042501 A1 | 3/2009 |
| DE | 102008025552 A1 | 12/2009 |
| DE | 102011082764 A1 | 4/2012 |
| DE | 102011084680 B3 | 11/2012 |
| DE | 102013203957 B3 | 2/2014 |
| DE | 102011082330 B4 | 8/2014 |
| DE | 102013206010 B3 | 8/2014 |
| DE | 102013005884 A1 | 10/2014 |
| DE | 102015205804 A1 | 10/2015 |
| EP | 586534 A4 | 12/1992 |
| EP | 1474622 A1 | 11/2004 |
| EP | 2128489 B1 | 8/2011 |
| EP | 2573423 A1 | 3/2013 |
| EP | 2557295 B1 | 6/2014 |
| ER | 2931917 A3 | 12/2009 |
| FR | 1249477 A | 11/1960 |
| FR | 2838492 A1 | 10/2003 |

(56) References Cited

FOREIGN PATENT DOCUMENTS

| | | |
|---|---|---|
| FR | 2910578 A1 | 6/2008 |
| FR | 2931917 A3 | 12/2009 |
| JP | 57134056 U | 9/1980 |
| JP | 58182045 U | 12/1983 |
| JP | 58220925 A | 12/1983 |
| JP | 58220925 A | 12/1983 |
| JP | 61179307 U | 11/1986 |
| JP | 777251 A | 3/1995 |
| JP | 07077251 | 3/1995 |
| JP | 2001059555 A | 3/2001 |
| JP | 2001153198 | 6/2001 |
| JP | 2004084772 A | 3/2004 |
| JP | 3652177 B2 | 3/2005 |
| JP | 2007517168 A | 6/2007 |
| JP | 2008202739 A | 9/2008 |
| WO | 26532 A1 | 5/2000 |
| WO | 2005057037 A1 | 6/2005 |
| WO | 2011002718 A1 | 1/2011 |
| WO | 2012049030 A1 | 4/2012 |
| WO | 2012061930 A1 | 5/2012 |
| WO | 2013055610 A1 | 4/2013 |
| WO | 2013087467 A1 | 6/2013 |
| WO | 2013142951 A1 | 10/2013 |
| WO | 2014085917 A1 | 6/2014 |
| WO | 2014100894 A1 | 7/2014 |
| WO | 2015027325 A1 | 3/2015 |
| WO | 2015070329 A1 | 5/2015 |
| WO | 2015119765 A1 | 8/2015 |
| WO | 2015167602 | 11/2015 |
| WO | 2016132054 A1 | 8/2016 |

OTHER PUBLICATIONS

Office Action for CN201480080094.6 dated Jun. 5, 2018—English translation.
Ford ES-FW8E-6B209-AA (FEAD Tensioner) (15417-500012).
Ford Motors—ES-FW8E-6B209-AA-Tens-FEAD (15417-500012).
Orbital Tensioner Hitlist 1,2,3.
Pawling Eng'd Products—Pneuma-Seal Catalog—2012.
SAE J2436—ADT Tensioner Test Standard (15417-500012).
SAE J2436 (ADT Tensioner Test Standard) (15417-500012) dated Jul. 1, 1998.
Supplementary European Search Report for EP13868328 dated Jun. 30, 2016.
Office Action for JP2015549906 dated Aug. 16, 2017.
Office Action for JP2015549906 dated Aug. 16, 2017—English translation.
Extended European search report for PCT/CA2014/000520.
Extended European Search Report on PCT/CA2015/051056 dated Apr. 26, 2018.
Office Action for JP2016575433 dated Mar. 22, 2018.
Office Action for JP2016575433 dated Mar. 22, 2018—English translation.
JP2001153198—machine-generated English translation.
JP07077251—machine-generated English translation.
Orbital Tensioner Hitlist 1,2,3 (not in file).
SAE J2436 (ADT Tensioner Test Standard) (15417-500012) dated Jul. 7, 1998.
Mechanical Components Structural Design Manual, National Defence Industry Press, Cover, Copyright page, Catalog page, pp. 136-166.

* cited by examiner

(12) United States Patent
US 10,520,066 B2

ORBITAL TENSIONER ASSEMBLY

CROSS-REFERENCE TO RELATED APPLICATIONS

This application is a continuation-in-part of PCT application PCT/CA2013/001085 and PCT/CA2013/001040, the disclosures of both of which are incorporated herein by reference in their entirety.

FIELD

This disclosure relates to tensioners for endless drive members and in particular to a tensioner that operates to tension an endless drive member engaged by two separate motive devices such as an engine and a motor/generator unit.

BACKGROUND

It is common for vehicle engines to drive a plurality of accessories using an accessory drive system that includes a belt. In some vehicles, a motive device is provided such as a motor/generator unit (MGU) that can be used for a number of purposes, such as, for example, driving one or more accessories via the belt when the engine is temporarily off while the vehicle is stopped for a short period of time (e.g. at a stoplight). Another purpose is for use as part of a belt alternator start (BAS) drive system wherein the MGU is used to start the engine through the belt. Another purpose is to supply additional power to the engine when needed (e.g. when the vehicle is under hard acceleration). In such situations special tensioning devices are typically needed to ensure that the belt is under the appropriate amount of tension regardless of whether it is being driven by the MGU or by the engine. In many instances however such tensioning devices are not optimal and result in relatively high belt tensions and hub loads on the various pulleys in the system, thereby negatively impacting fuel economy and component life.

It would be desirable to provide a tensioning system that at least partially addresses one or more of the problems described above and other problems.

SUMMARY

In an aspect, a tensioner is provided for tensioning an endless drive member that is engaged with a rotary drive member on a shaft of a motive device. The tensioner includes a base that is mountable to the motive device, a ring that is rotatably supported by the base in surrounding relationship with the shaft of the motive device and which is rotatable about a ring axis, a tensioner arm pivotally mounted to the ring for pivotal movement about an arm pivot axis, and first and second tensioner pulleys. The first tensioner pulley is rotatably mounted to the tensioner arm. The tensioner arm is biased towards a first span of the endless drive member on one side of the rotary drive member. The second tensioner pulley is rotatably mounted at least indirectly to the ring and is biased towards a second span of the endless drive member on another side of the rotary drive member. The ring is rotatable in response to hub loads in the first and second tensioner pulleys that result from engagement with the first and second spans of the endless drive member.

BRIEF DESCRIPTION OF THE DRAWINGS

The foregoing and other aspects of the disclosure will be more readily appreciated by reference to the accompanying drawings, wherein.

DETAILED DESCRIPTION OF EXAMPLE EMBODIMENTS

Figure 1:
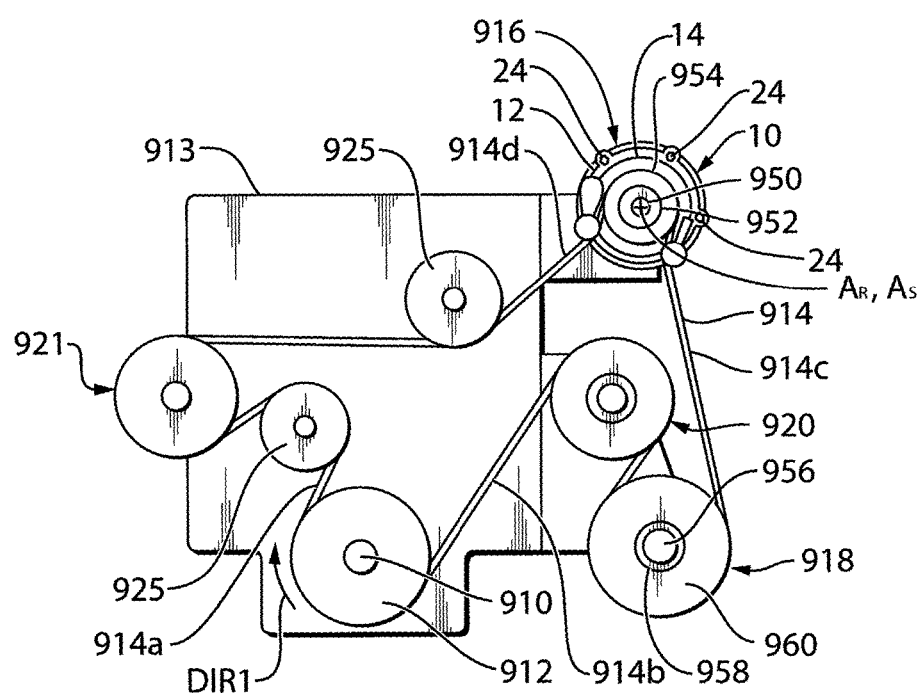
FIG. 1 is a side view of an engine containing a tensioner in accordance with an embodiment of the present disclosure.

Reference is made to FIG. 1, which shows a crankshaft 910 from an engine 913 from a vehicle (not shown). It will be noted that the engine 913 is shown as a simple rectangle for illustrative purposes. It will be understood that the engine 913 may have any suitable shape and may be any suitable type of engine such as a spark-ignition engine or a diesel engine. The vehicle may be any suitable vehicle, such as an automobile, a truck, a van, a minivan, a bus, an SUV, a military vehicle, a boat or any other suitable vehicle.

The crankshaft 910 has a crankshaft pulley 912 thereon. The crankshaft pulley 912 drives one or more vehicle accessories via a belt 914. The term 'belt' is used herein for convenience, however for the purpose of the claims and for the scope of this disclosure it will be understood that the belt 914 may alternatively be any other type of suitable endless drive member. It will further be noted that, in cases where the endless drive member is a belt, it may be any suitable type of belt, such as a flat belt, a V belt, a poly-V belt, a timing belt, or any other suitable type of belt. The term 'pulley' is similarly used for convenience and any other suitable rotary drive member may be used instead, such as a sprocket.

The accessories may include, for example, the MGU 916, an air conditioning compressor 918, a water pump 920, a power steering pump 921 and/or any other suitable accessories. The system further includes a plurality of idlers 925 that are positioned to provide a selected amount of belt wrap about the pulleys of some of the accessories.

Each of the driven accessories has a shaft, and a pulley that may be connectable and disconnectable from the shaft via a clutch. For example, the MGU shaft, clutch and pulley are shown at 950, 952 and 954 respectively. In another example, the air conditioning compressor shaft, clutch and pulley are shown at 956, 958 and 960 respectively. Clutching each of the accessories permits each to be disconnected when not needed while the belt 914 itself is still being driven by the crankshaft 910.

In some vehicles, such as some hybrid vehicles, the engine 913 may be stopped temporarily in some situations (such as when the vehicle is stopped at a stoplight) and may then be started again when it is time for the vehicle to move. In such situations, the MGU 916 can be operated as a generator when the engine 913 is running so as to generate electricity for storage in a vehicle battery (not shown). In some embodiments, the MGU 916 operated as an electric motor to drive the crankshaft 912 via the belt 914, enabling the engine 913 to be started via the belt 914 (i.e. a belt-alternator start (BAS) drive system).

The MGU 916 may instead be some other type of motive device such as an electric, hydraulic or pneumatic motor, which may be used to drive accessories or to start the engine 913. The MGU or other motive device 916 may be referred to generally as a supplemental motive device, as it is a supplemental means for driving the belt 914, whereas the engine 913 is a primary motive device for driving the belt 914. Furthermore, in some embodiments, the engine 913 may instead be some other type of motive device, such as an electric motor. Instead of, or in addition to, being used to start the engine 913 and/or to drive accessories while the engine 913 is off, the supplemental motive device may be used to provide a power boost to the engine 913 via the belt 914 (e.g. to provide a burst of acceleration for the vehicle).

Providing tension in the belt 914 is beneficial in that it reduces the amount of slip that can occur between the belt 914 and the driven accessory pulleys, between the belt 914 and the MGU 916, and between the belt 914 and the crankshaft 910. In FIG. 1, the direction of rotation of the crankshaft 910 is shown at DIR1. When the engine 913 is driving the belt 914 and the MGU 916 acts as a generator, it will be understood that a relatively higher tension will exist on the trailing belt span, shown at 914*a*, and a relatively lower tension will exist on the leading belt span, shown at 914*b*, where the terms 'trailing' and 'leading' are relative to the crankshaft pulley 912 in this context. In general, the belt tension will decrease progressively through each belt span along the belt routing between the span 914*a* and the span 914*b*. By contrast, when the MGU 916 is driving the belt 914 and the engine 913 is off, the trailing belt span, shown at 914*c* (trailing relative to the MGU 916) has the highest belt tension, and the leading belt span 914*d* (leading relative to the MGU 916) has the lowest belt tension. Thus it can be seen that the belt tension in the spans 914*c* and 914*d* can vary significantly during operation of the vehicle in the two different modes (i.e. in a first mode where the engine 913 is the sole driver of the belt 914 as compared to a second mode where the MGU 916 is the sole driver of the belt 914). Tensioners have been proposed for some vehicles in which the tensioner has two arms that are fixedly connected to one another to form a V, wherein each arm has a pulley, and wherein the V is pivotally mounted to a base that is fixedly mounted to a region of the engine inside the contained area of the belt. The pulleys engage two different spans of the belt, (e.g. a span on either side of an accessory such as an MGU). As a result of their configuration, such a tensioner is capable of maintaining tension in both spans so that the belt tension is kept in the span needing it the most, regardless of whether the MGU is being driven as a generator or is being operated as a motor.

Such a tensioner, however, can be bulky and there is not always sufficient room in the aforementioned region to locate it.

Figure 2:
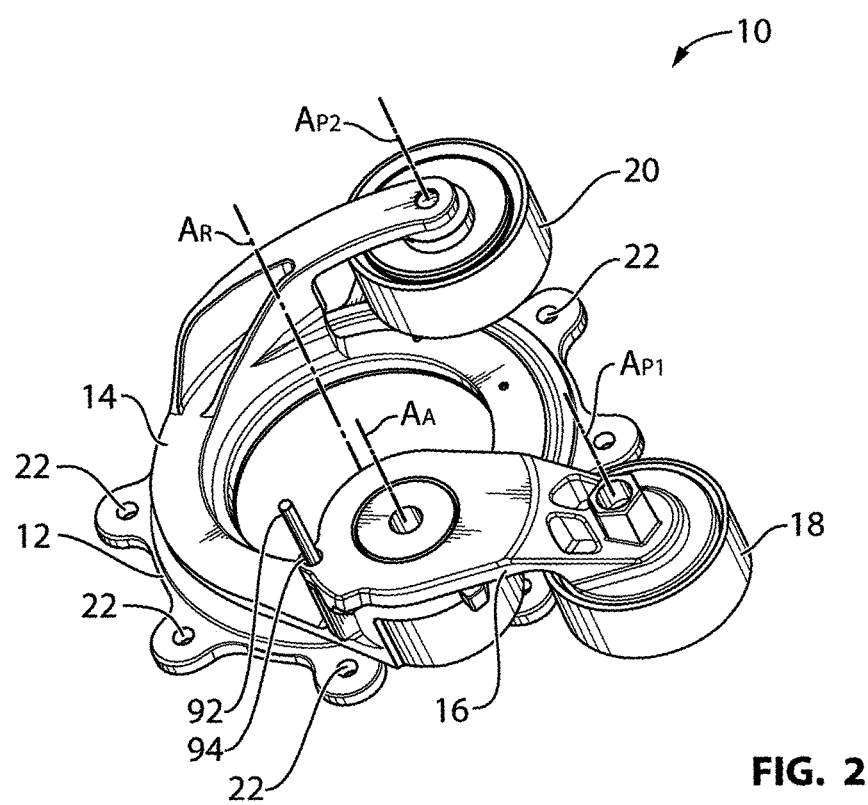
FIGS. 2 and 3 are perspective views of the tensioner shown in FIG. 1.
Figure 3:
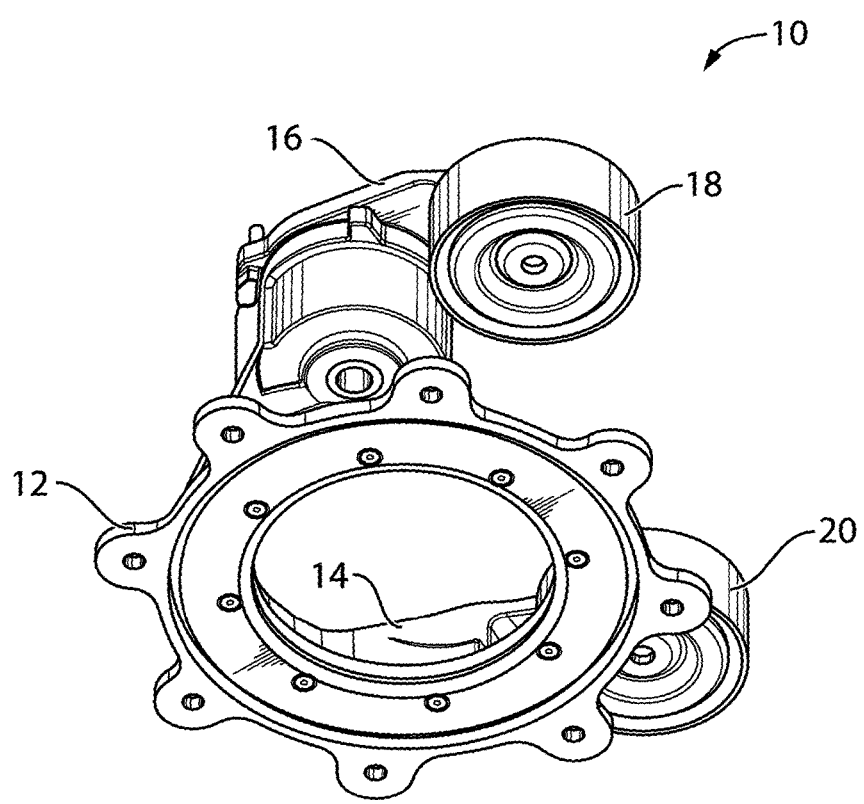

In accordance with an embodiment of the present invention, an orbital tensioner 10 is provided for tensioning the endless drive member 614, which is engaged with the rotary drive member 954 on the shaft 950 of the motive device 916. With reference to FIGS. 2 and 3, the tensioner 10 includes a base 12, a ring 14, a tensioner arm 16, a first tensioner pulley 18 and a second tensioner pulley 20.

The base 12 may be made from aluminum or some other suitably strong material and is fixedly mountable to the MGU 916. In the example shown in FIG. 2 the base 12 includes a plurality of fastener apertures 22, which receive fasteners 24 (FIG. 1) for mounting the base 12 to a housing of the MGU 916.

The ring 14 may also be made from aluminum or another suitable material and is rotatably supported by the base 12 in surrounding relationship with the shaft 950 of the motive device 916 and is rotatable about a ring axis shown at $A_R$ in FIGS. 1 and 2. As shown in FIG. 1, the ring axis $A_R$ may be coaxial with the axis of rotation of the MGU shaft 950, which is shown at A.

Figure 4:
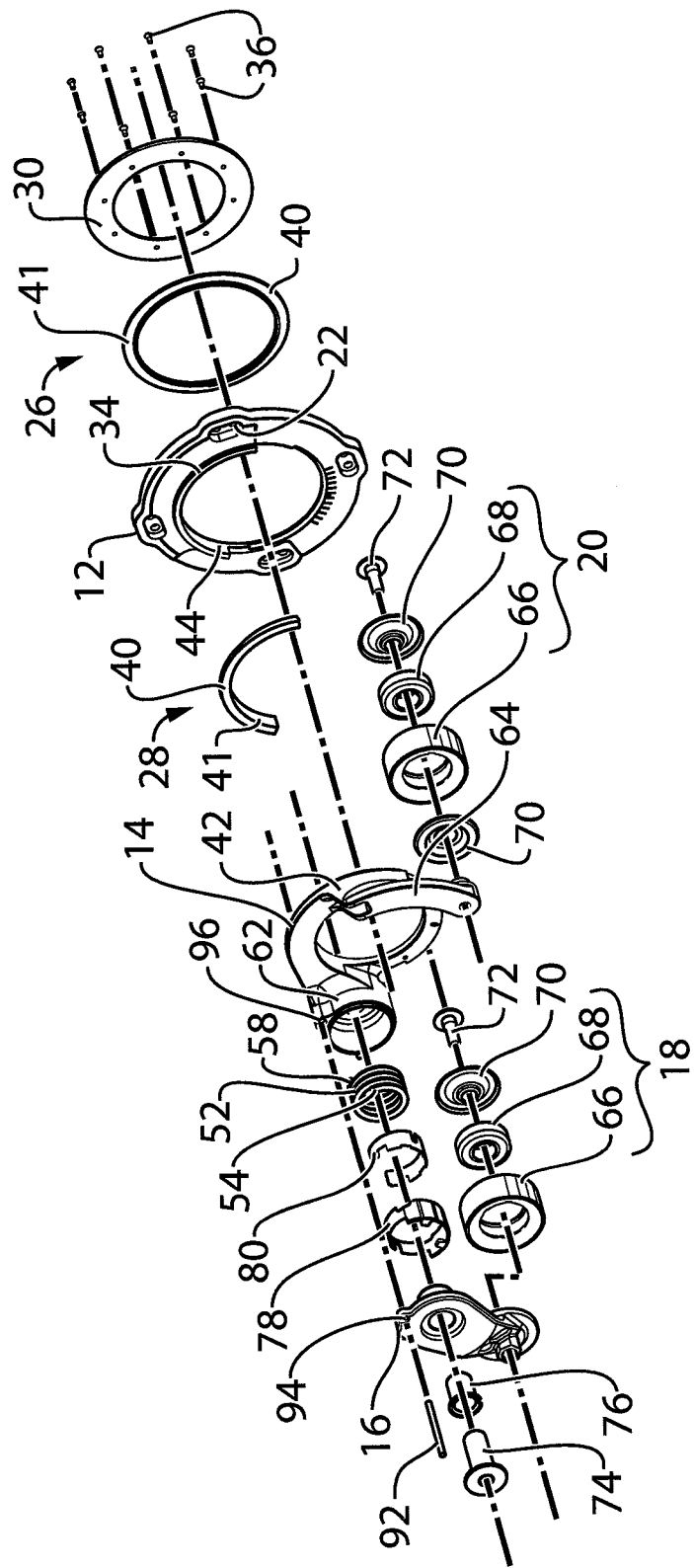
FIGS. 4 and 5 are perspective exploded views of a variant of the tensioner shown in FIG. 2.
Figure 5:
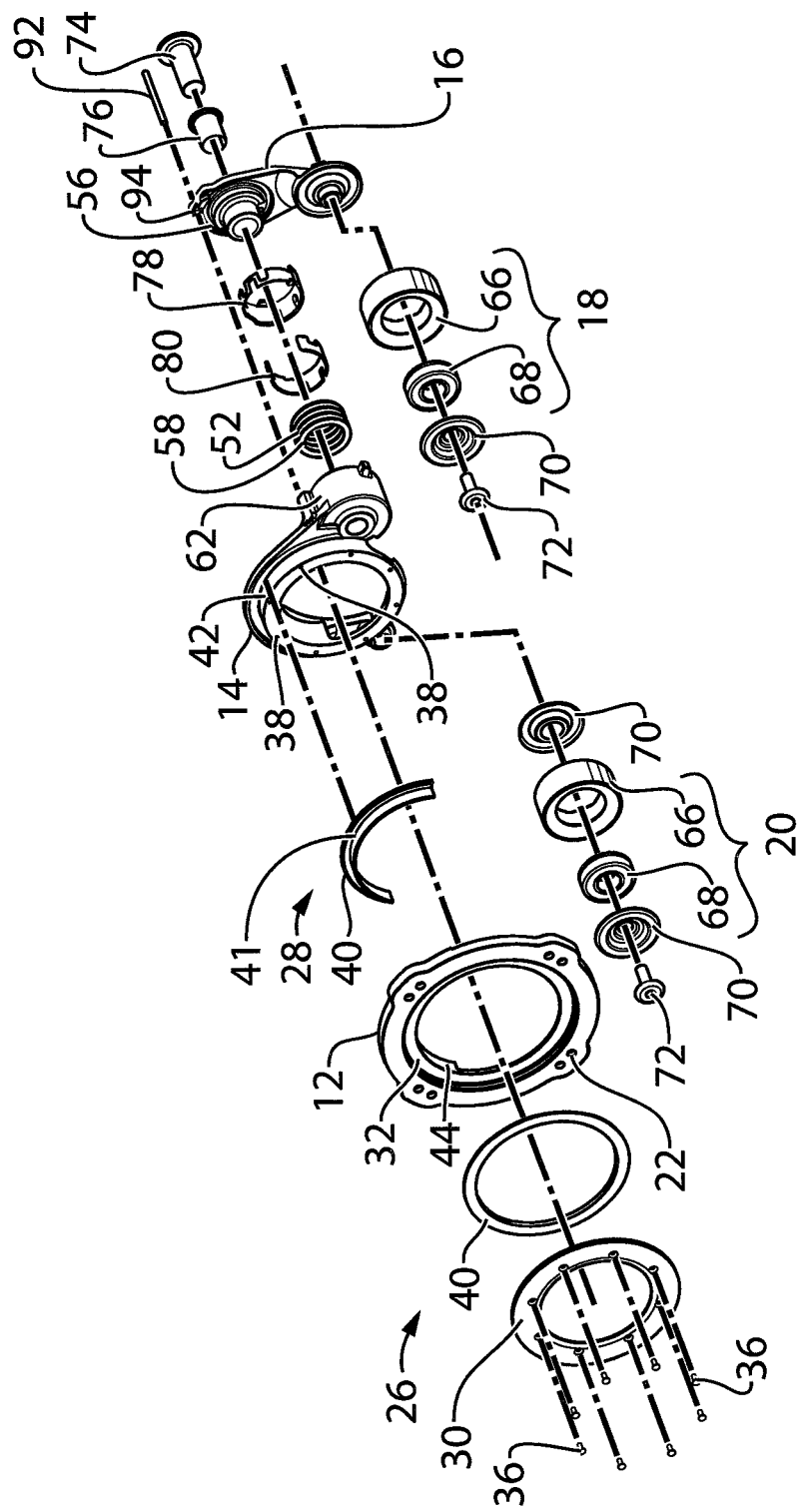

FIGS. 4 and 5 show exploded views of the tensioner 10. It will be noted that the base 12 shown in FIGS. 4 and 5 is a minor variant of the base shown in FIGS. 2 and 3, with a principal difference being a different distribution of mounting apertures 22. Referring to FIGS. 4 and 5 a first ring bushing 26 and a second ring bushing 28 are provided. The ring bushings 26 and 28 can be configured to apply any desired amount of friction to the ring 14 to provide any desired amount of damping to the movement of the ring 14 on the base 12. When used intentionally to apply a selected amount of damping to the movement of the ring 14, the ring bushings 26 and 28 may be referred to as first and second ring damping members 26 and 28. Suitable material of construction for the bushings 26 and 28 may be, for example, polyamide 4.6 or 6.6 or some other suitable polymeric material.

In the embodiment shown, a clamping member 30 is provided and is connected to the ring 14 such that the clamping member 30 cooperates with the ring 14 to clamp the base 12 and the first and second ring damping members while still permitting sliding movement of the ring 14 relative to the base 12. With this arrangement, the first ring bushing 26 is positioned between the clamping member 30 and a first face 32 (FIG. 5) of the base 12, and the second ring bushing 28 is positioned between the ring 14 and the a second face 34 (FIG. 4) of the base 12. During movement of the ring 14 when the tensioner 10 is in use, the sliding occurs by the clamping member 30 on the first bushing 26 and/or by the first bushing 26 on the base 12, and sliding also occurs by the ring 14 on the second bushing 28 and/or by the second bushing 28 on the base 12. As a result of the aforementioned sliding movement, the first and second ring bushings 26 and 28 apply a frictional force (i.e. a damping force) to the ring 14.

In the embodiment shown, the first ring bushing 26 is a complete circle, covering the entire circumference of the ring 14 and base 12. However, the second ring bushing 28 covers less than the entire circumference of the ring 14 and base 12 (and in the embodiments shown, less than 180 degrees of arc). The second ring bushing 28 is positioned in a first region of the tensioner 10 that is outside of a second region that lies under the belt 914 (FIG. 1). In the first region there is less of a height constraint on the tensioner components, whereas in the second region there can be significant height constraint. The part of the circumference of the ring 14 and base 12 where the second ring bushing 28 is not routed is in the second region of the tensioner 10, so as help keep the height of the tensioner 10 sufficiently low to avoid interference with the belt 914.

Optionally, the clamping member 30 may be threadably connected to the ring 14 (e.g. via engagement of threaded fasteners 36 with threaded apertures 38 in the ring 14) so as to permit adjustment of a gap between the clamping member 30 and the ring 14, and therefore adjustment of the clamping force therebetween. This permits adjustment of a damping force exerted on the ring 14 via the first and second ring damping members 26 and 28.

It will be noted that the first and second ring bushings 26 and 28 have radially extending portions, shown at 40 respectively, which are the portions of the bushings 26 and 28 that act on the first and second faces 32 and 34 of the base 12. Additionally however, the bushings 26 and 28 further include axially extending portions 41 (FIG. 5) that act between the radially outer face 42 of the ring 14 and the radially inner ring-receiving wall 44 of the base 22.

Figure 6:
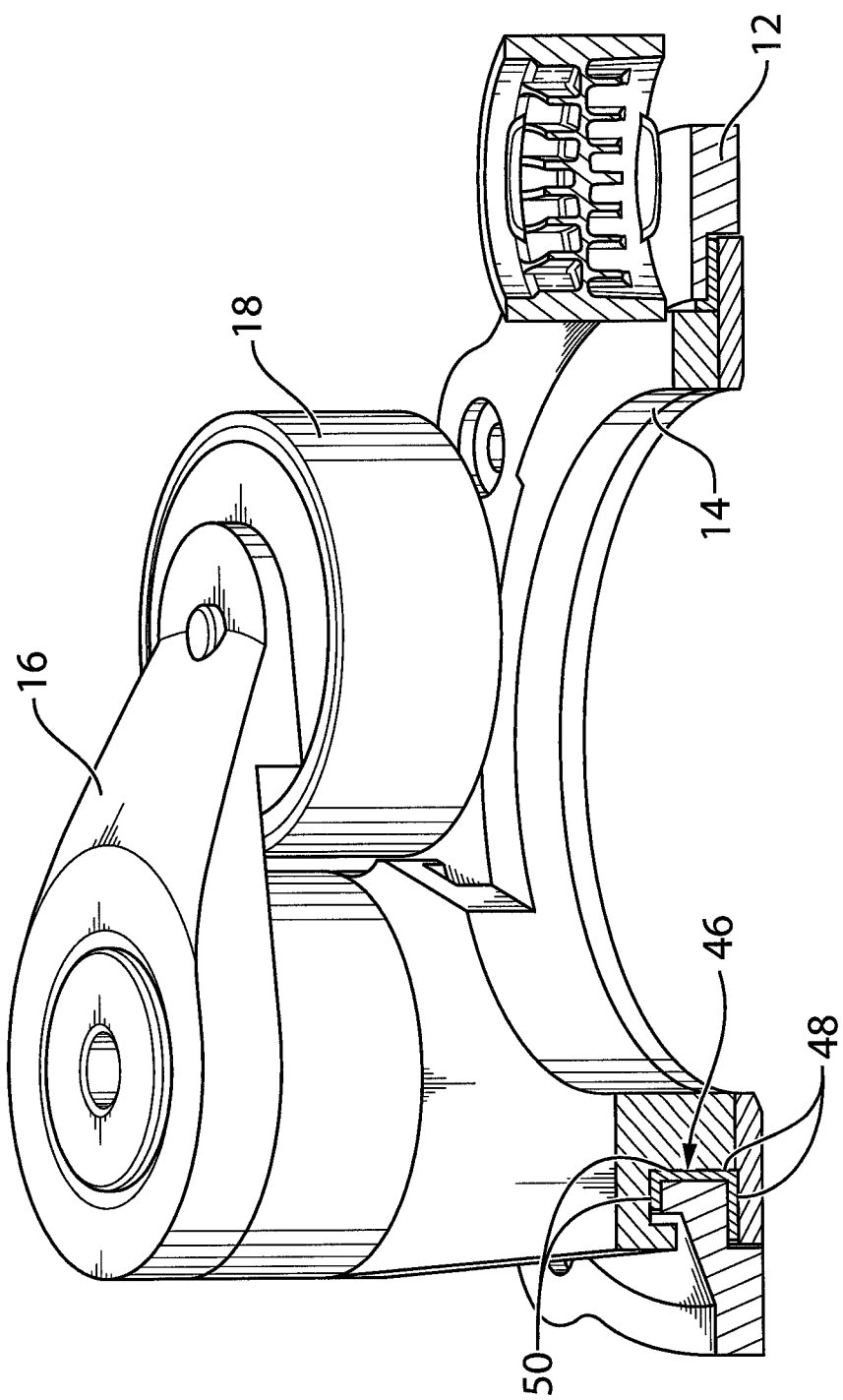
FIG. 6 is a sectional perspective view of a variant of the tensioner shown in FIG. 2.
Figure 7:
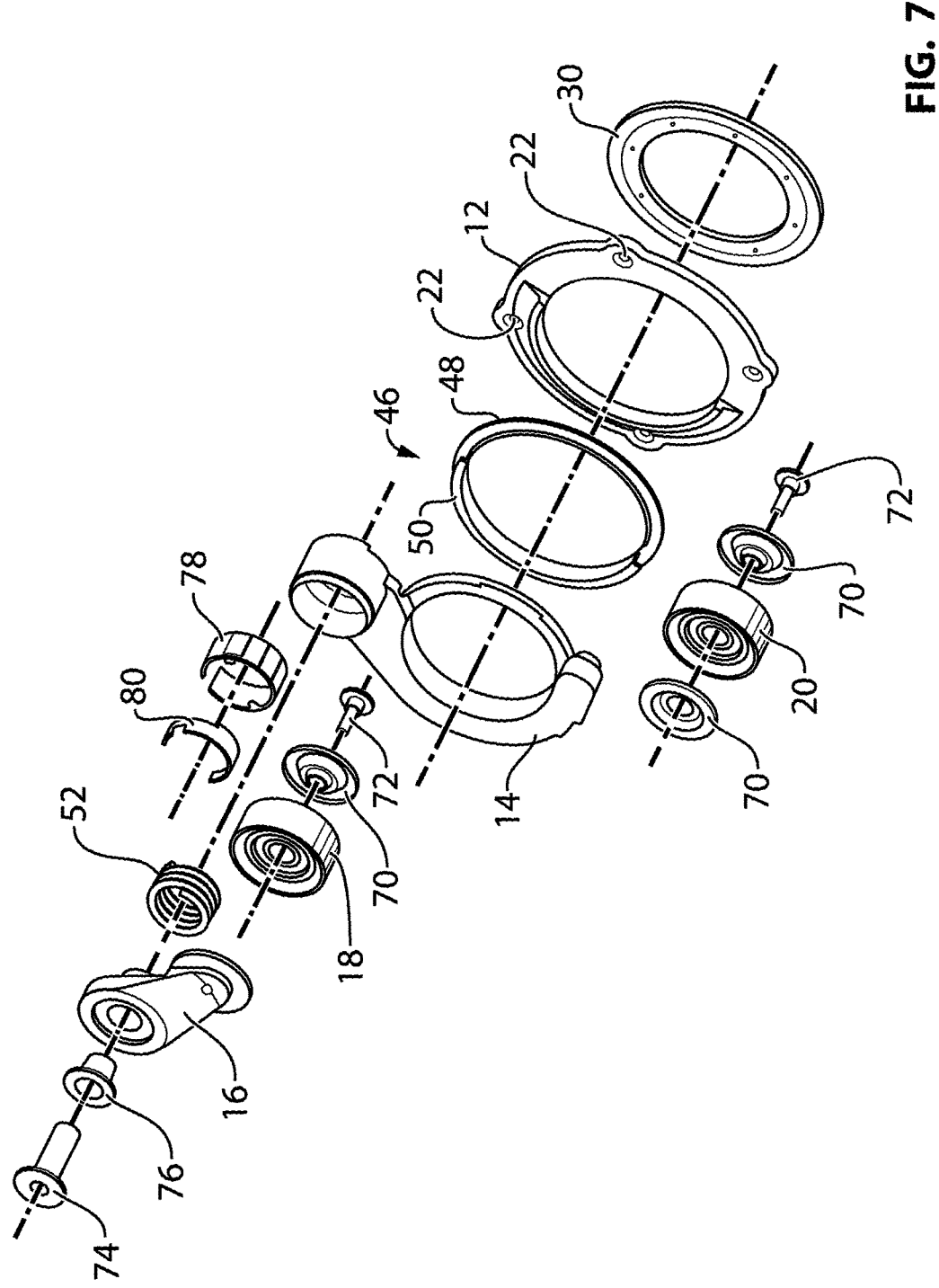
FIG. 7 is a perspective exploded view of the tensioner shown in FIG. 6.

A sectional side view of the tensioner 10 is shown in FIG. 6, however, in this view it can be seen that the first and second ring bushings 26 and 28 are replaced by a single bushing 46 that includes a first portion 48 (see also FIG. 7) that is similar to the first bushing 26 (FIG. 4) and acts between the clamping member 30 and the base 12, and a second portion 50 that is similar to the second bushing 28 and acts between the ring 14 and the base 12.

Figure 8:
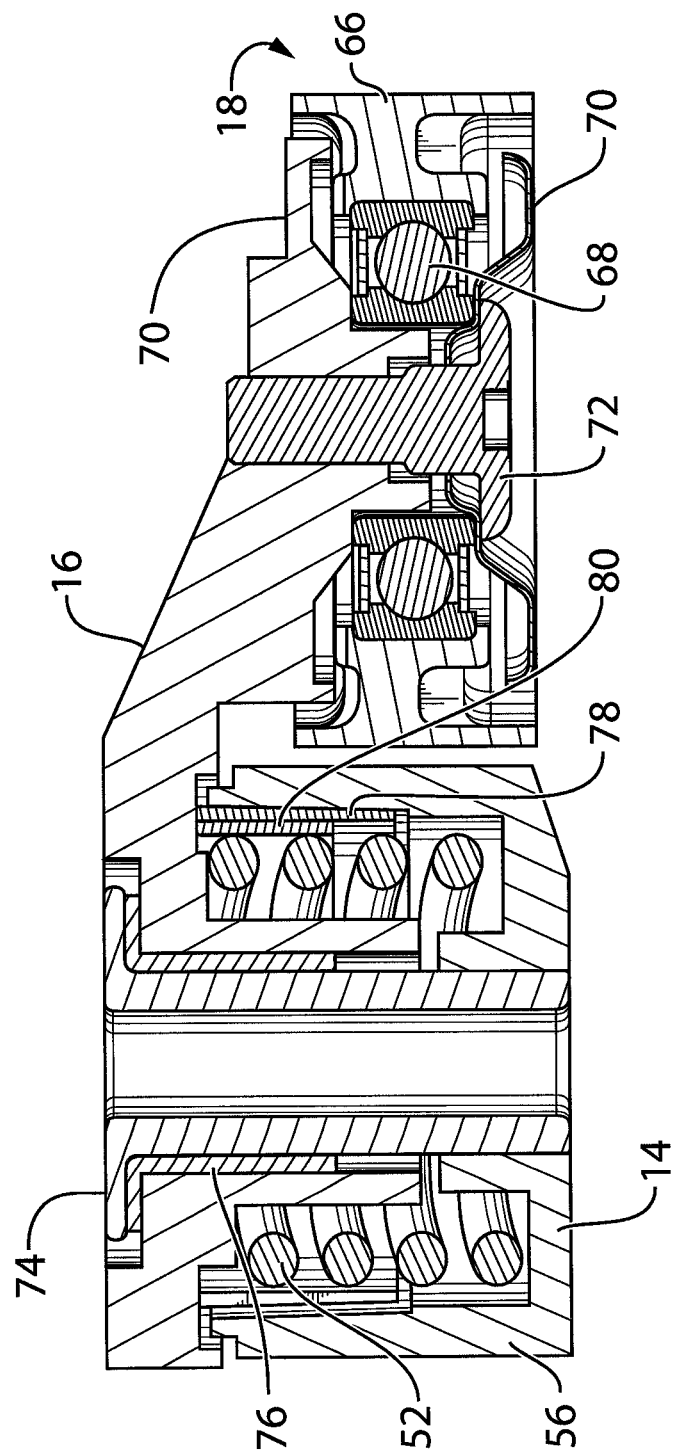
FIG. 8 is a sectional perspective view of a portion of the tensioner shown in FIG. 2.

Referring to FIG. 2, the tensioner arm 16 is made from aluminum or another suitable material and is pivotally mounted to the ring 14 for pivotal movement about an arm pivot axis $A_A$. The tensioner arm 16 has the first tensioner pulley 18 rotatably mounted thereon, for rotation about a first pulley axis $A_{P1}$, which is spaced from the arm pivot axis $A_A$. Referring to FIG. 1, the tensioner arm 16 is biased in a free arm direction towards a first span 914d of the endless drive member 914 on one side of the rotary drive member 954. The tensioner arm 16 may be biased in the free arm direction by a tensioner arm biasing member 52 (FIGS. 4, 5 and 8). For example, the tensioner arm biasing member 52 may be any suitable kind of biasing member, such as for example, a torsion spring having a first end 54 (FIG. 4) that engages a first drive wall 56 (FIG. 5) on the arm 16, and a second end 58 (FIG. 4) that engages a second drive wall in a spring housing portion 62 on the ring 14.

The tensioner arm 16 is part of a tensioner arm assembly that further includes a shaft member 74 which mounts (e.g. via threaded engagement) to the ring 14, a pivot bushing 76 that pivotally supports the tensioner arm 16 on the shaft member 74, and an optional damping structure 76 that includes a polymeric (e.g. unfilled (non-reinforced) nylon) tensioner arm damping member 78 and a metallic (e.g. steel) sleeve 80 that holds the damping member 78 and protects the damping member 78 against damage from engagement with the torsion spring 52. The damping member 78 provides damping for the movement of the tensioner arm 16. The components of the tensioner arm assembly may be similar to the analogous components described in PCT publication no. WO2013/059929, the contents of which are incorporated herein in their entirety. The tensioner arm assembly may alternatively be as described in patent publications EP0450620B1, DE20319886U1, and DE04010928C2, the contents of all of which are incorporated herein by reference in their entirety.

Referring to FIG. 2, the second tensioner pulley 20 is rotatably mounted at least indirectly to the ring 14 for rotation about a second pulley axis $A_{P2}$. In the embodiment shown in FIG. 2, the pulley 20 is mounted directly to the ring 14, via a fixed projection 64 on the ring 14.

The second tensioner pulley 20 is biased towards a second span 914c of the endless drive member 914 on another side of the rotary drive member 954. This biasing occurs by virtue of the forces transferred to the ring 14 by the tensioner arm biasing member 52. More specifically, during operation of the tensioner 10, when the first pulley 18 is engaged with the belt span 914d, the belt span 914d applies a hub load to the first pulley 18. This hub load acts on the arm 16 through the pulley 18. The force on the arm 16 is transferred through the biasing member 52, and into the ring 14 itself, urging the ring 14 to pivot about axis $A_R$ in the opposite rotational direction to the direction of pivoting of the arm 16. This force transfer into of the ring 14 urges the second tensioner pulley 20 in a second free arm direction, into the second belt span 914c. Thus the ring 14 is rotatable about the ring axis $A_R$ in response to hub loads in the first and second tensioner pulleys 18 and 20 that result from engagement with the first and second spans 914d and 914c of the endless drive member 914.

Each of the pulleys 18 and 20 may have the same construction. For example, each pulley 18, 20 may include a pulley body 66, a bearing 68, and a pulley mounting fastener 72 used to mount (e.g. by threaded engagement) the pulley 18, 20 to the tensioner arm 16 or to the projection 64. Optional first and second dust shields 70 are provided to protect the bearing 68 from dust during operation of the tensioner 10. The dust shields 70 may be separate components that sandwich the bearing 68 to inhibit the migration of dust and debris into the bearing 68. As can be seen one of the dust shields 70 for the pulley 18 is provided as an integral portion of the tensioner arm 16.

The bearing 68 may be a ball bearing, as shown, or it may be any other suitable type of bearing. The bearing 68 could also be a bushing in some embodiments.

Figure 9:
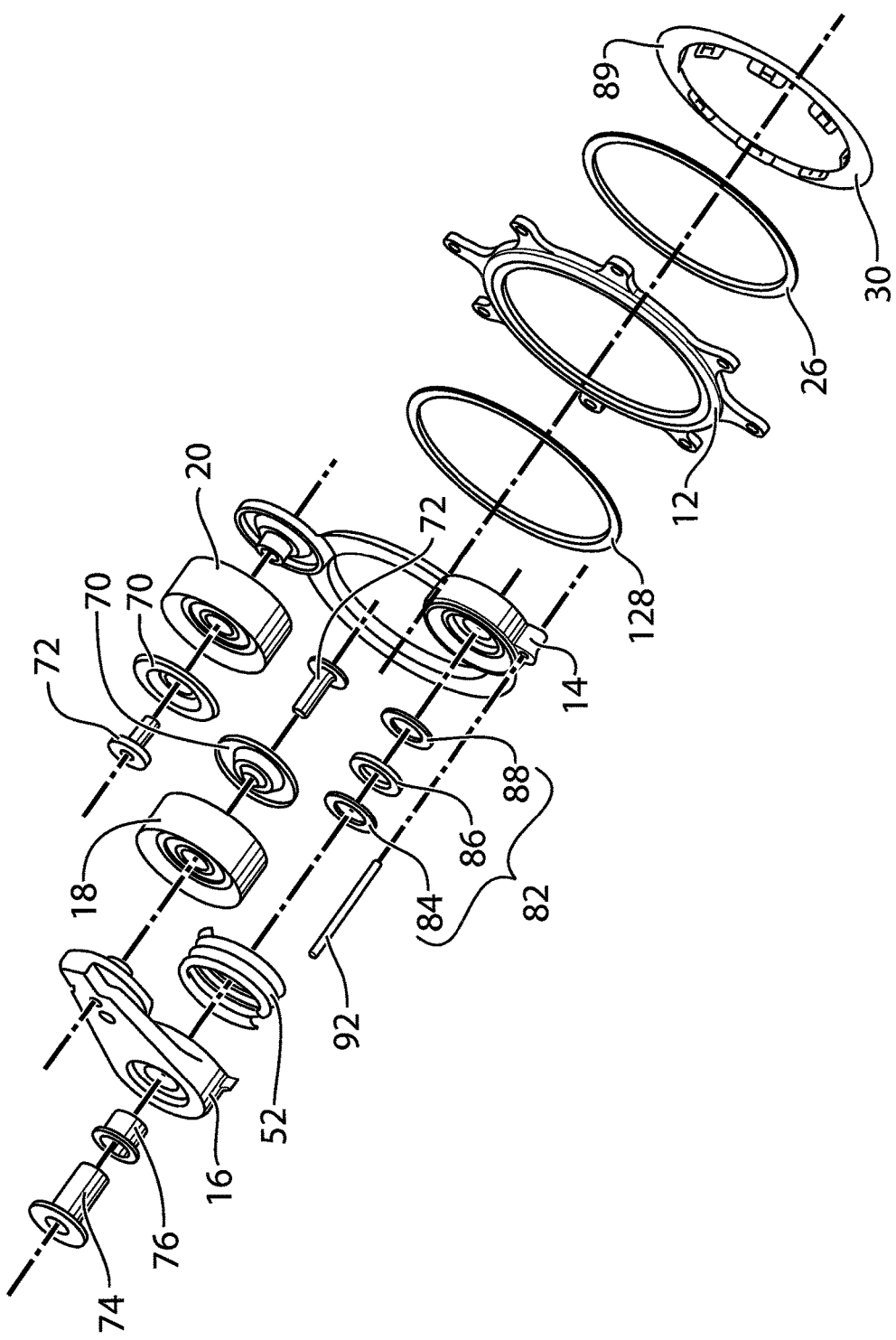
FIG. 9 is a perspective exploded view of a variant of the tensioner shown in FIG. 2, incorporating different damping structures.
Figure 10:
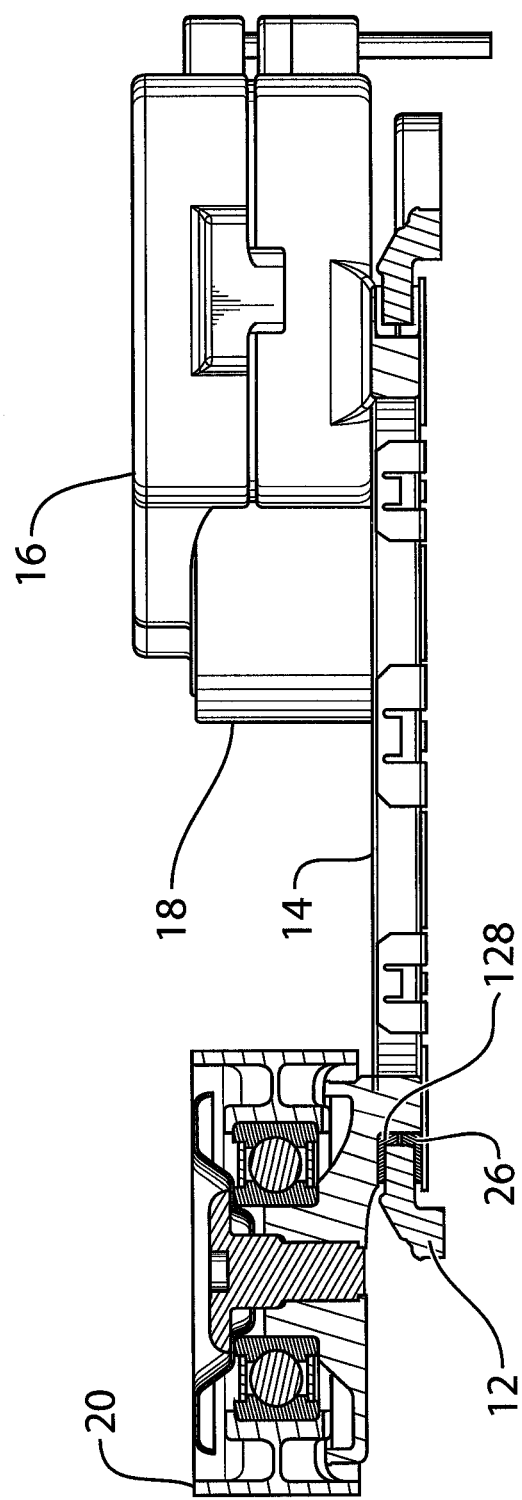
FIG. 10 is a sectional side view of the tensioner shown in FIG. 9.
Figure 11:
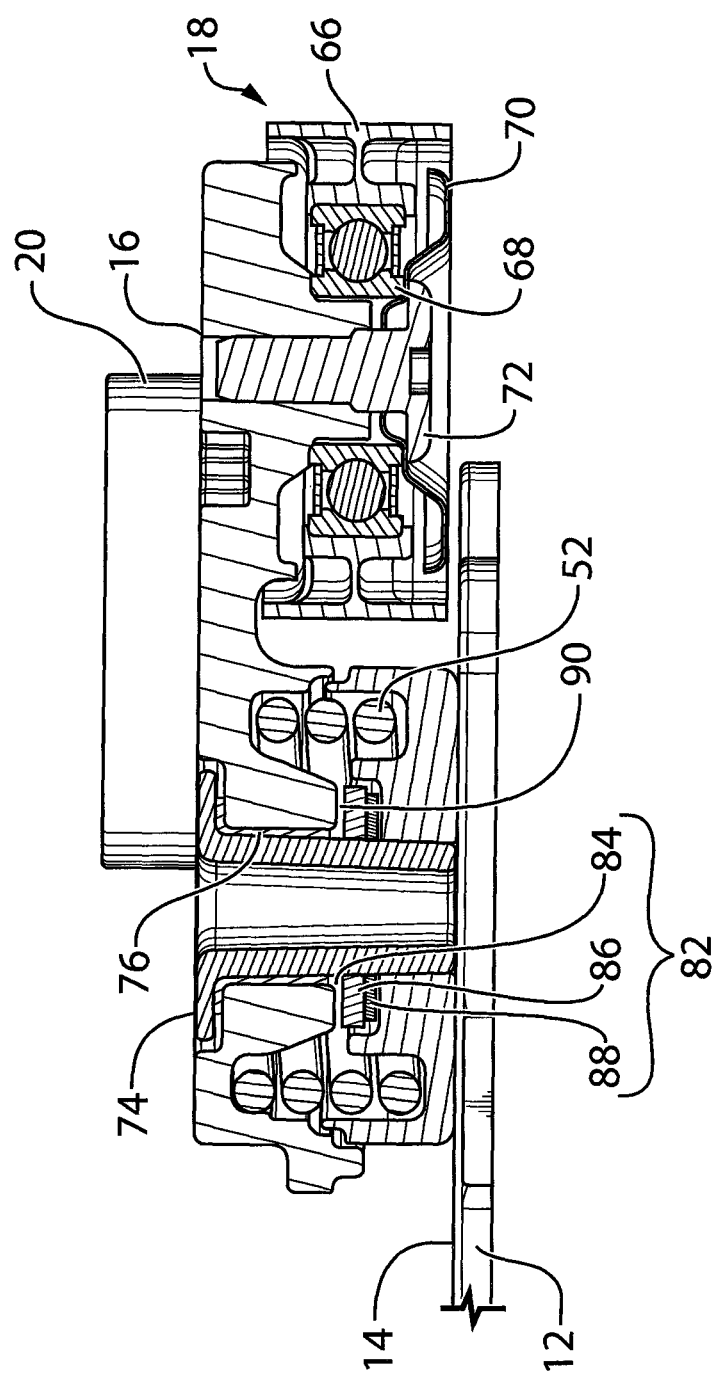
FIG. 11 is another sectional side view of the tensioner shown in FIG. 9.

Reference is made to FIGS. 9, 10 and 11, which show the tensioner 10 with some modified features. As can be seen in FIG. 9, the second ring bushing is shown at 128 and extends about the entire circumference of the ring 14 and the base 12. This provides improved stability of the ring 14 in terms of resistance to yaw.

As can be seen in FIGS. 9 and 11, a different damping structure is used to provide damping for the tensioner arm 16. The damping structure is shown at 82 and includes a damping member 84, a support member 86 and a damping member biasing member 88. The damping member 84 may be made from any suitable material such as a suitable polymeric material, such as polyamide 4.6 or polyamide 6.6. The damping member 84 slidingly engages a damping surface 90 on the tensioner arm 16 (FIG. 11). A support member 86 supports the damping member 84, and the biasing member 88 acts between a support surface 92 on the ring 14 and the support member 86. The biasing member 88 may be any suitable type of biasing member, such as, for example, a steel Belleville spring washer. The support member 86 may be made from a suitable material such as steel, so as to prevent damage (e.g. gouging) to the damping member 84 by the biasing member 88 due to the relative softness of the damping member 84 as compared to the biasing member 88.

The damping structure 82 may be similar to the damping structure disclosed in US patent application publication US2008/0280713, the contents of which are incorporated herein in their entirety. Providing a damping structure similar to the damping structure 82 is advantageous in embodiments where it is desirable to providing damping to the movement of the tensioner arm 16 that is independent of the hub load incurred by the first pulley 18.

Another difference between the embodiments shown in FIGS. 2-8 and the embodiment shown in FIG. 9 is that the clamping member 30 in FIG. 9 is not threaded, but instead includes clip portions that clip onto receiving members on the ring 14. In the embodiment shown in FIG. 9, the flange portion of the clamping member 30 (which is shown at 89) may be relatively thin in cross-section so as to render it resilient, and may be shaped to apply a spring force on the damping member 26. This arrangement can be configured so that a consistent force is applied to the damping member 26 by the clamping member 30 reducing the need for assembly worker expertise.

It will be further noted that the damping members 26 and 28 also provide damping that is substantially independent of the hub load incurred by the pulleys 18 and 20. Additionally, it will be noted that the use of two damping members 26 and 28 both of which are at relatively large diameters (i.e. large moment arms) from the ring axis $A_R$, reduces the average amount of force that each damping member 26 and 28 must apply to achieve a selected damping load.

The damping members 26 and 28 may have surface properties that provide symmetric damping in the sense that the damping force exerted by the damping members 26 and 28 may be the same irrespective of the direction of movement of the ring 14. Alternatively, however, the damping members 26 and 28 may be provided with surface properties (e.g. a fish-scale effect) that provides lower damping in one direction and higher damping in the opposite direction. Other means for achieving asymmetrical damping are alternatively possible, such as the use of a ramp structure whereby the ring 14 rides up the ramp structure urging it into progressively stronger engagement with a damping member (so as to increase the damping force) during rotation in a first direction and wherein the ring 14 rides down the ramp structure urging it into weaker engagement with the damping member thereby reducing the damping force during movement in the second direction.

In other embodiments, the members 26 and 28 may be configured to provide as little damping as possible thereby increasing the responsiveness of the tensioner 10.

Figure 12:
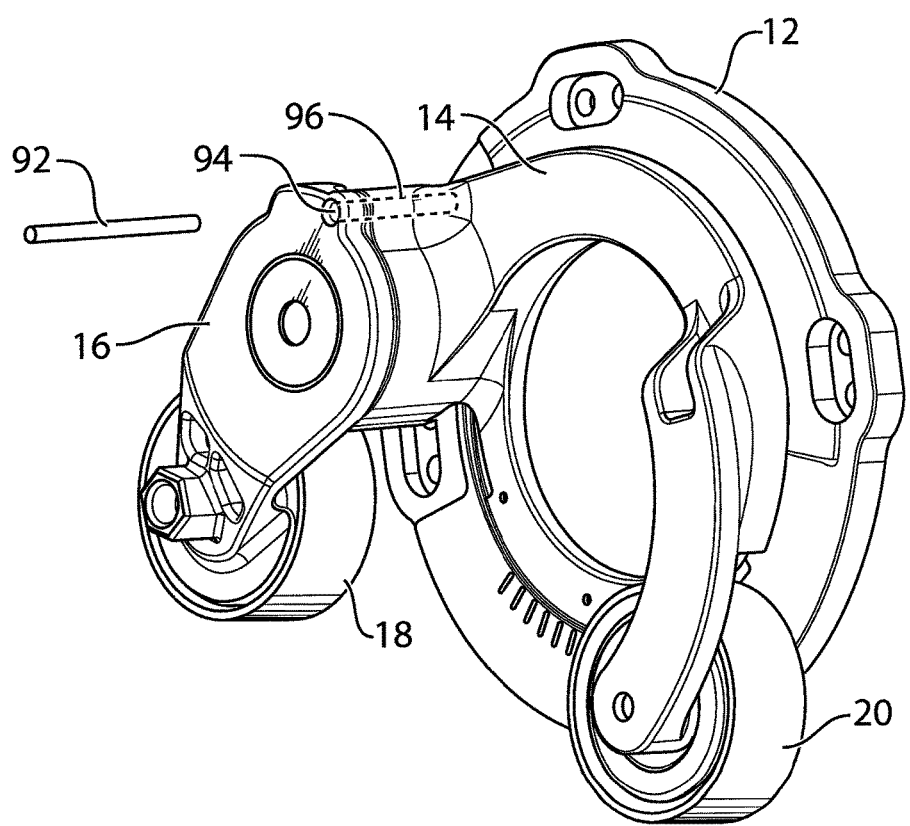
FIG. 12 is a perspective view of another variant to the tensioner shown in FIG. 2

Reference is made to FIGS. 4, 5 and 12, which show an installation pin 92 that facilitates installation of the belt 914 (FIG. 1) on the pulleys 18, 20 and 954 when the tensioner 10 is already installed on the motive device 916. The installation pin 92 can be passed through an optional tensioner arm pin aperture 94 into an optional ring pin aperture 96, to lock the tensioner arm 16 in a position that is away from a free arm stop position and that is towards a load stop position. The free arm stop position represents one end of a range of movement of the arm 16, and is the position that the tensioner arm 16 would end up in if there were no belt present to resist the arm's movement. The load stop position represents the other end of the range of movement of the arm 16 and is the position the arm 16 would end up in if the belt tension were sufficiently high to completely overcome the biasing force of the biasing member 52.

Once the belt 914 (FIG. 1) has been installed throughout the accessory drive system on the engine 913, the installation pin 92 (FIG. 12) may be removed from the apertures 94 and 96 permitting the biasing member 52 to drive the arm 16 and pulley 18 into the belt 914. The pin 92 is shown in the installed position in FIG. 2. The installation pin 92 is a pin in the examples shown herein, however it will be understood that the installation pin 92 may instead be any suitable type of arm locking member that locks the tensioner arm 16 in a selected angular position to permit the belt 914 to be installed on the pulleys 18, 20 and 954.

Figure 13:
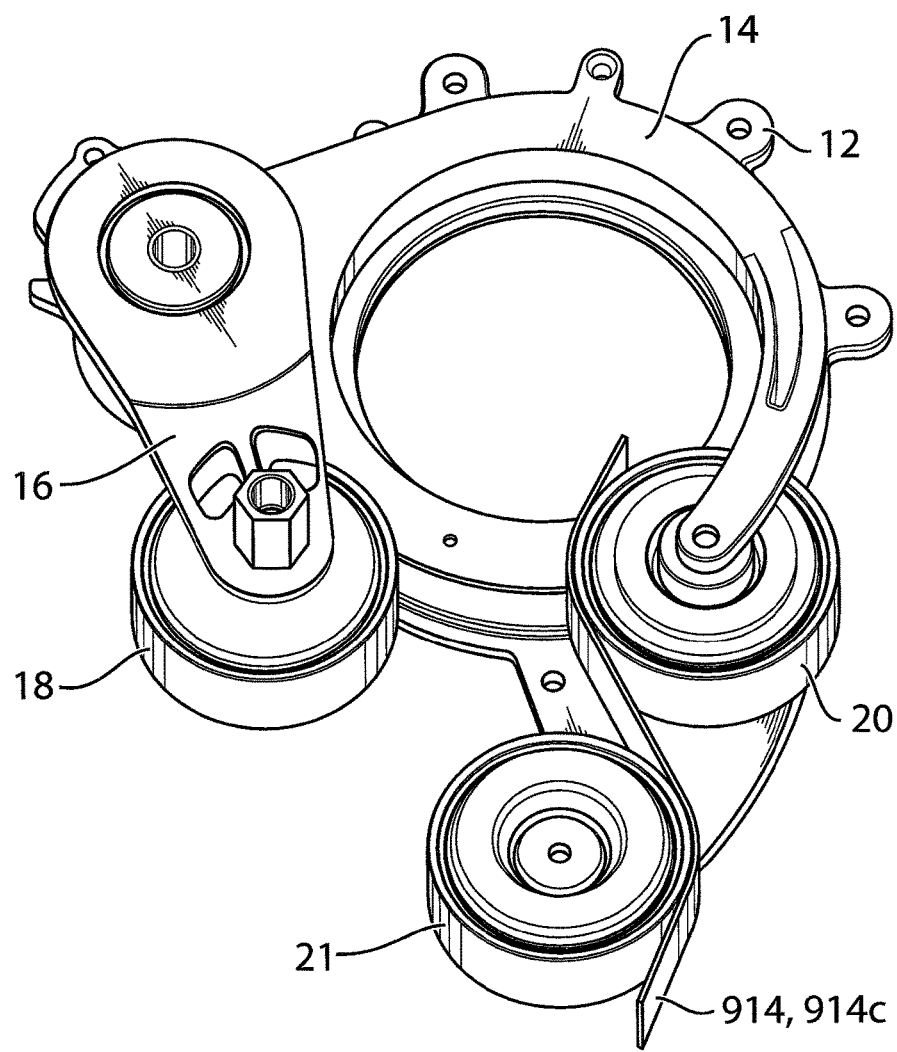
FIGS. 13-17 are perspective views of other variants of the tensioner shown in FIG. 2.

Reference is made to FIG. 13, which shows the tensioner 10 with another variation in features. In this embodiment, the tensioner 10 includes a third tensioner pulley shown at 21. The third pulley 21 permits the tensioner 10 have a selected amount of belt wrap about the MGU pulley 954 (FIG. 1) while providing a selected orientation to the belt span 914c. As a result, the belt span 914c can be routed to avoid interference hazards near the engine 913.

Figure 14:
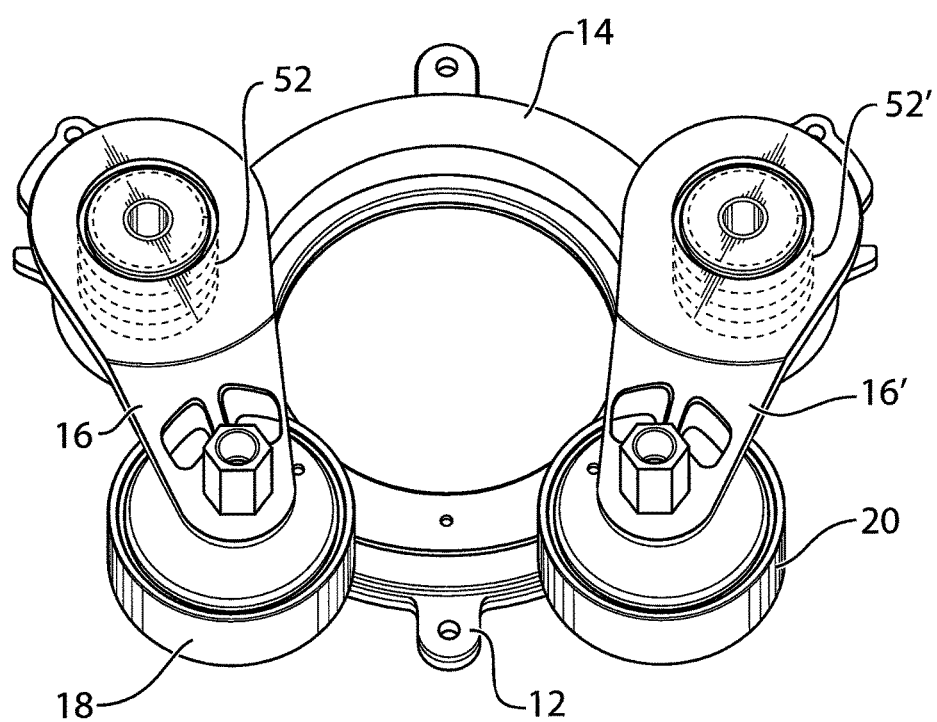

Reference is made to FIG. 14, which shows the tensioner 10 with a second tensioner arm assembly. In other words, the tensioner arm 16 is a first tensioner arm, and the tensioner biasing member 52 is a first tensioner biasing member, and the tensioner 10 includes a second tensioner arm 16' that may be similar but a mirror image of the first tensioner arm 16, and which is biased in a free arm direction into the belt span 914c by a second tensioner biasing member 52'. The introduction of the second biasing member 52' introduces a different set of forces into the ring 14 during changes in belt tension and therefore changes in the hub loads on the pulleys 18 and 20 than exists with the arrangement shown in FIGS. 2 and 3.

Figure 15:
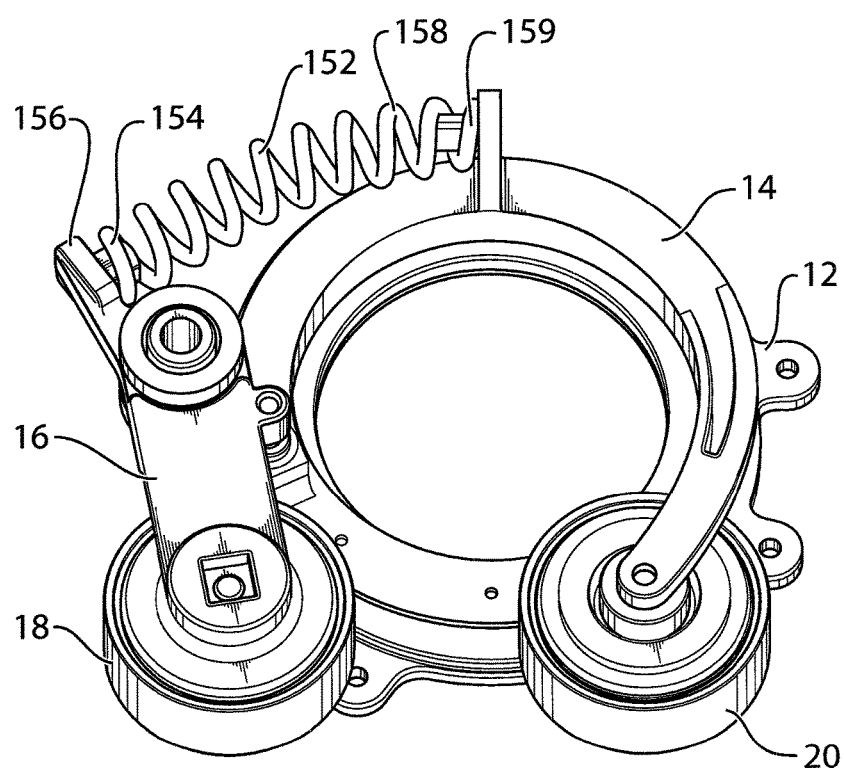

Reference is made to FIG. 15, which shows the tensioner 10 that uses an arcuate, helical compression spring 152 instead of a torsion spring as the tensioner biasing member. The compression spring 152 has a first end 154 that engages a first drive surface 156 on the tensioner arm 16, and a second end 158 that engages a second drive surface 159 on the ring 14.

Figure 16:
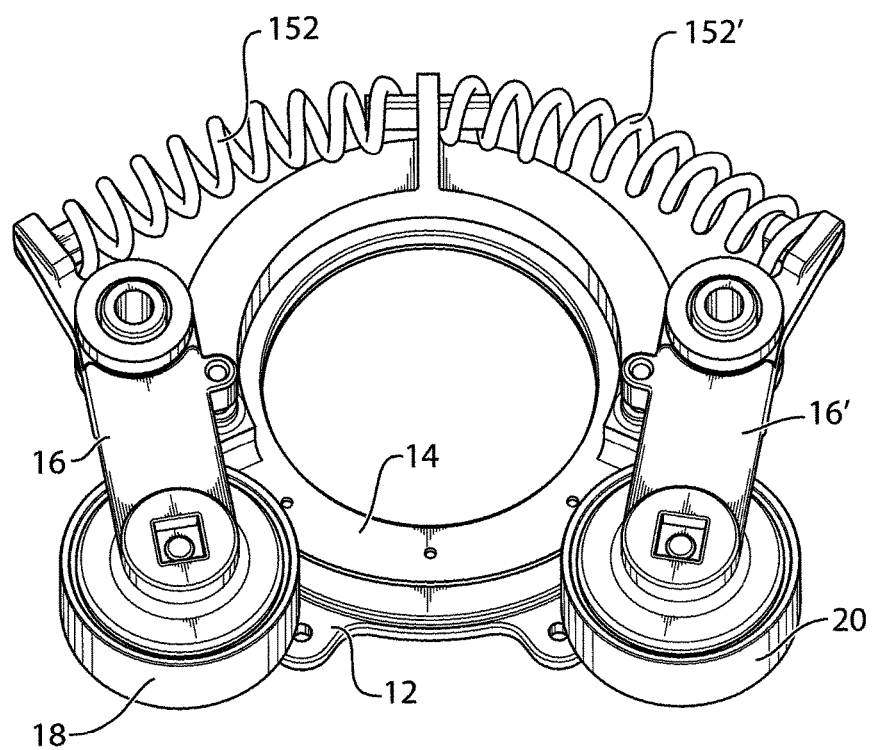
Figure 17:
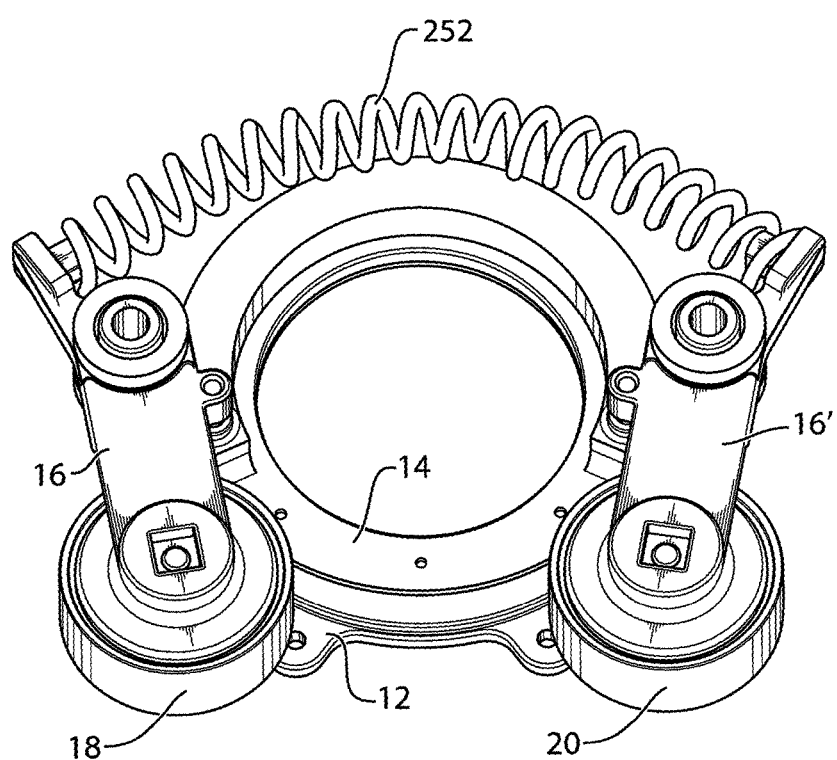

The tensioner 10 as shown in FIG. 16 includes two helical compression springs, shown respectively at 152 and 152', which act on first and second tensioner arms 16 and 16' respectively. In the embodiment shown in FIG. 16, each compression spring 152, 152' acts between a respective tensioner arm 16 and a drive surface on the ring 14. By contrast, an embodiment shown in FIG. 17 includes a single spring that acts between the first and second tensioner arms 16 and 16' and does not act directly on the ring 14.

Figure 18:
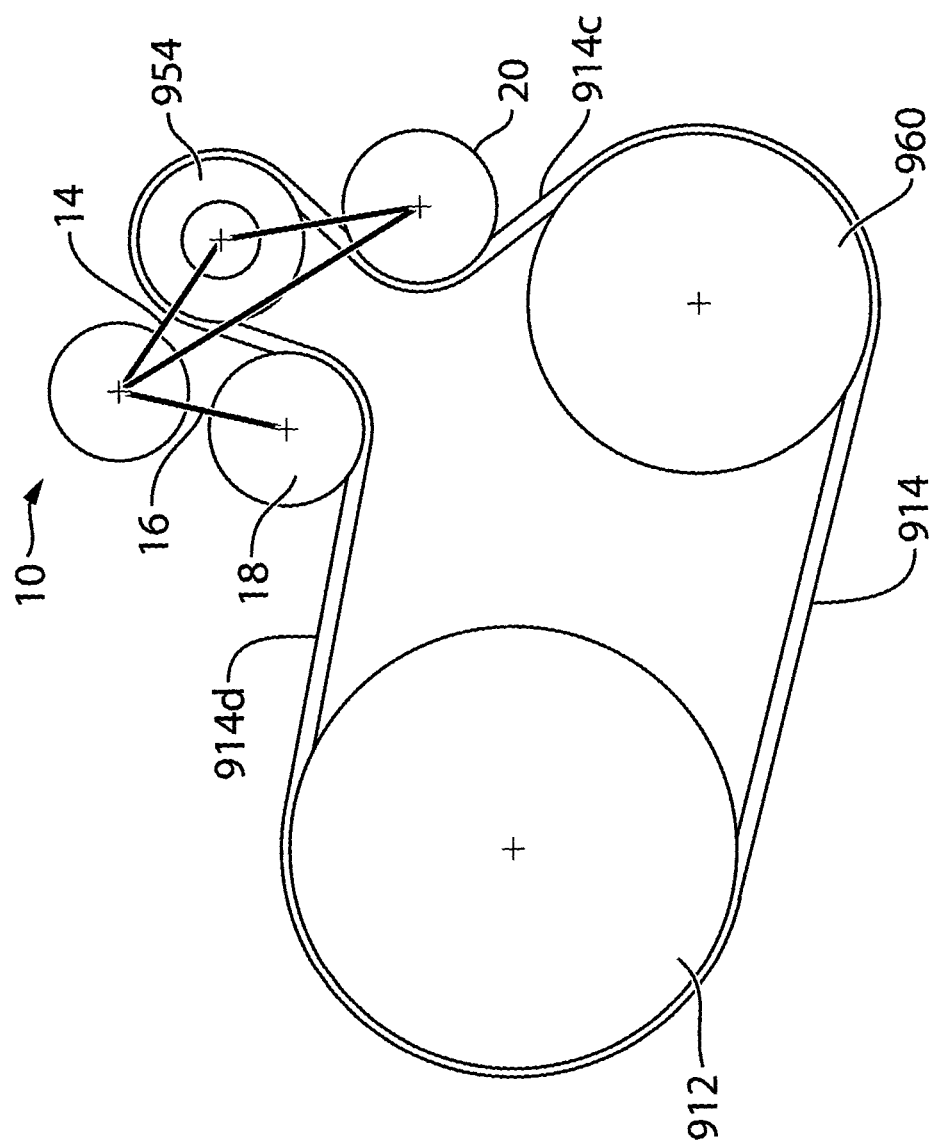
FIGS. 18-20 are schematic views of the tensioner shown in FIG. 2 under different operating conditions.
Figure 19:
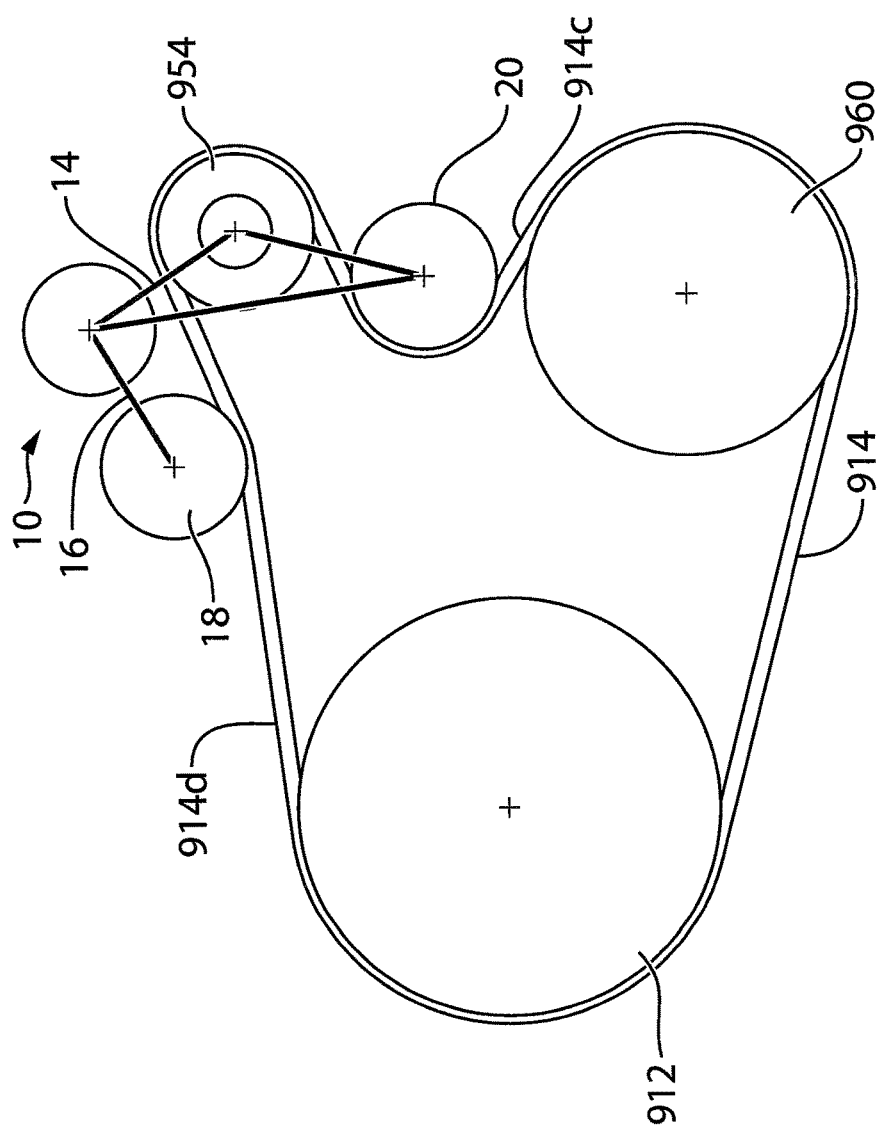
Figure 20:
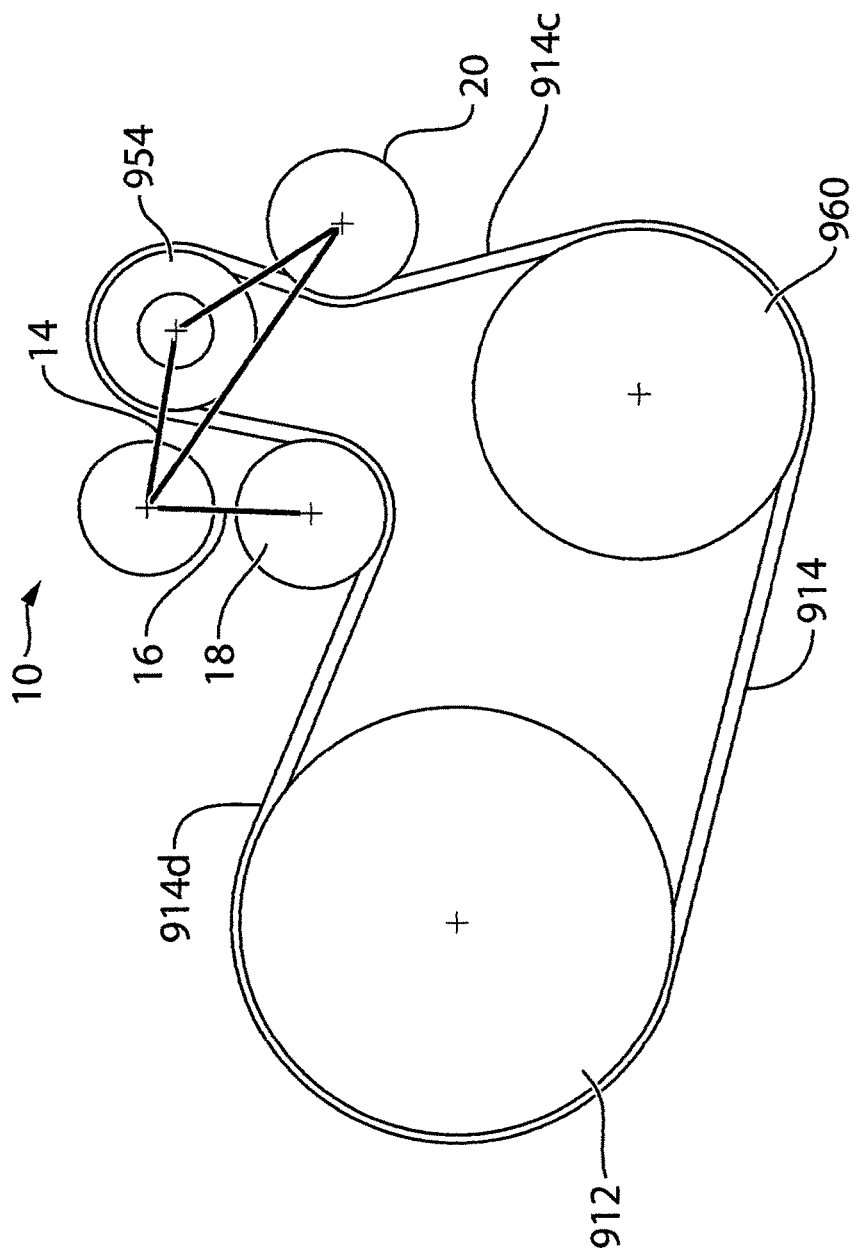

FIGS. 18-20 are schematic views of the tensioner 10 with a single tensioner arm 16, illustrating different situations. FIG. 18 illustrates a situation where the engine 913 (FIG. 1) is operating at a substantially constant load, (e.g. at idle with no MGU load). The belt tension in spans 914c and 914d may be substantially the same. FIG. 19 illustrates a situation where the MGU pulley 954 is driven by the MGU 16 (FIG. 1), either to operate accessories when the engine 913 is off, or to start the engine 913, or to provide a boost of power to a running engine 913. As can be seen, the ring 14 has rotated clockwise as a result of the increased tension in belt span 914d and the reduced belt tension in span 914c. FIG. 20 illustrates a situation where the engine 913 (FIG. 1) is under high load, thereby increasing the belt tension in span 914c and reducing the belt tension in span 914d, while the MGU 916 is either not operating or is operating as a generator. As can be seen the ring 14 has rotated counterclockwise as a result of the reduced tension in span 914d and the increased tension in span 914c.

Figure 21:
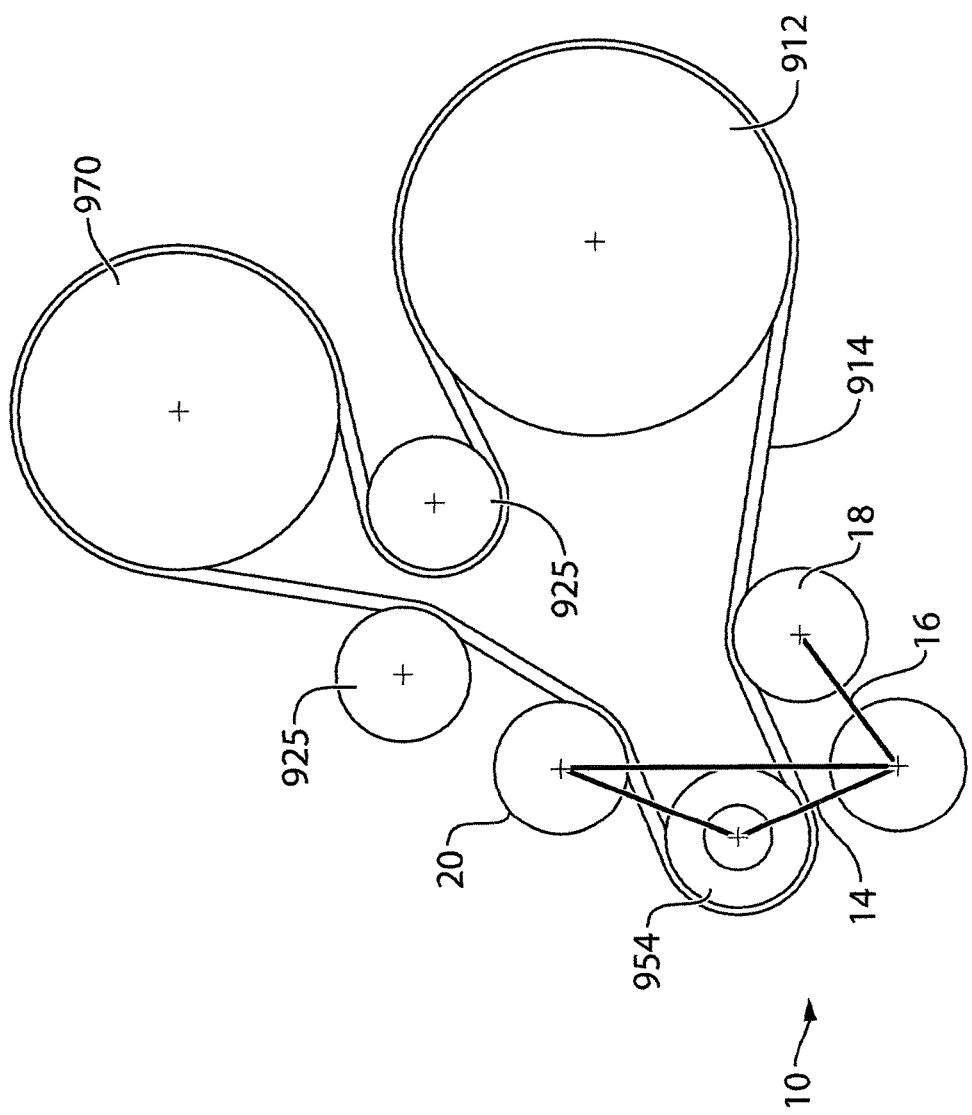
FIGS. 21 and 22 are schematic views of different engine and accessory layouts connected by an endless drive member and incorporating the tensioner shown in FIG. 2.

FIG. 21 shows an alternative engine layout that includes an accessory pulley 970 (in this instance for a water pump) and two idlers 925 that ensure that there is a selected amount of belt wrap around the crankshaft pulley 912 and around the accessory pulley 970 even when the MGU pulley 954 is being driven by the MGU 916 (FIG. 1). This reduces the likelihood of slip at the crankshaft pulley 912 when the crankshaft pulley 912 represents a high load (e.g. during a BAS starting event).

Figure 22:
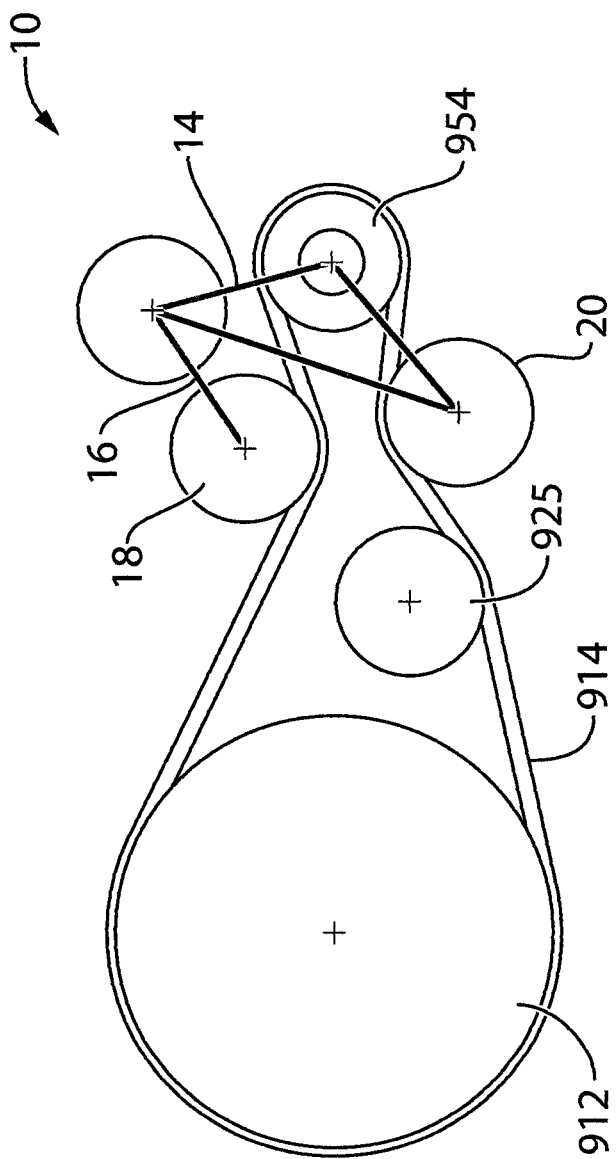

FIG. 22 shows another alternative engine layout that includes only the MGU pulley 954, the crankshaft pulley 912, the tensioner 10 and an idler 925.

Figure 23:
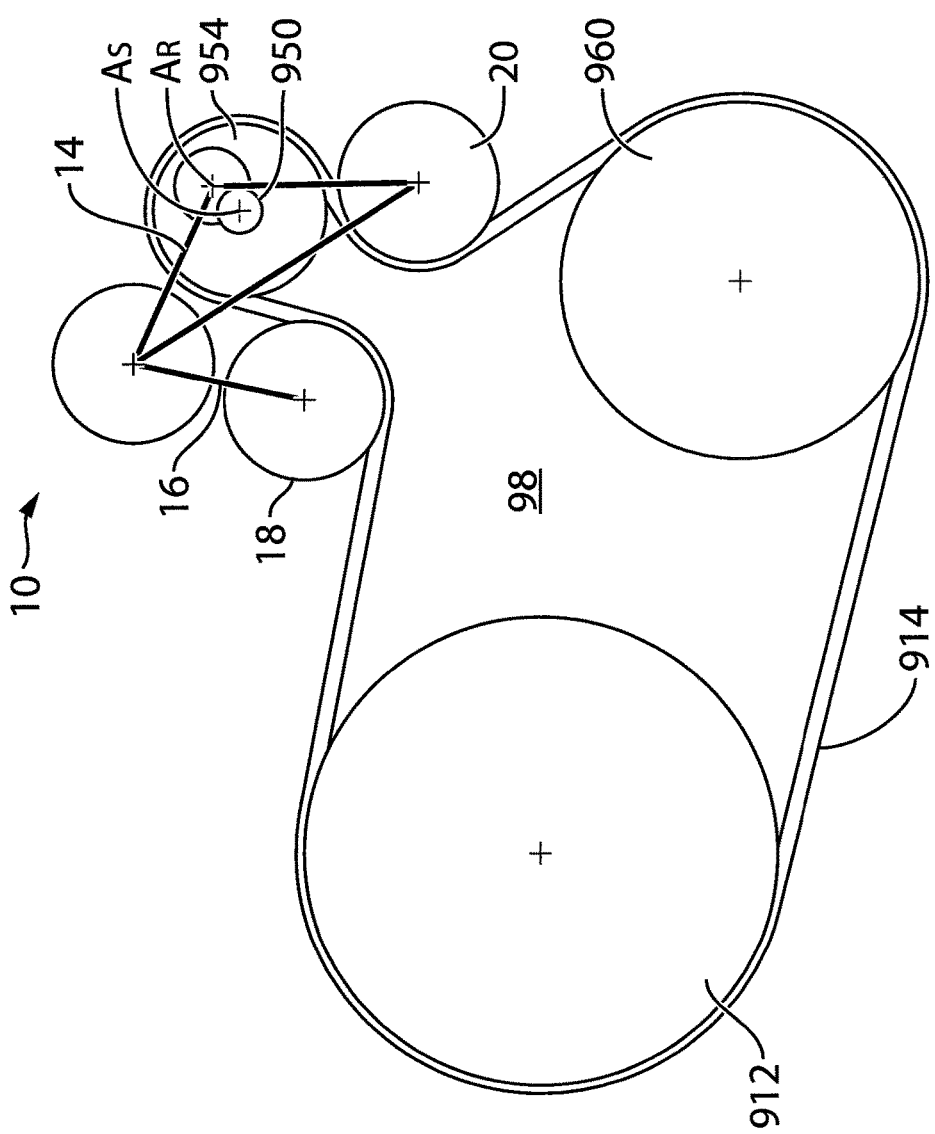
FIGS. 23 and 24 are schematic views of the tensioner shown in FIG. 2 in different positions relative to a motive device to which it is mounted.
Figure 24:
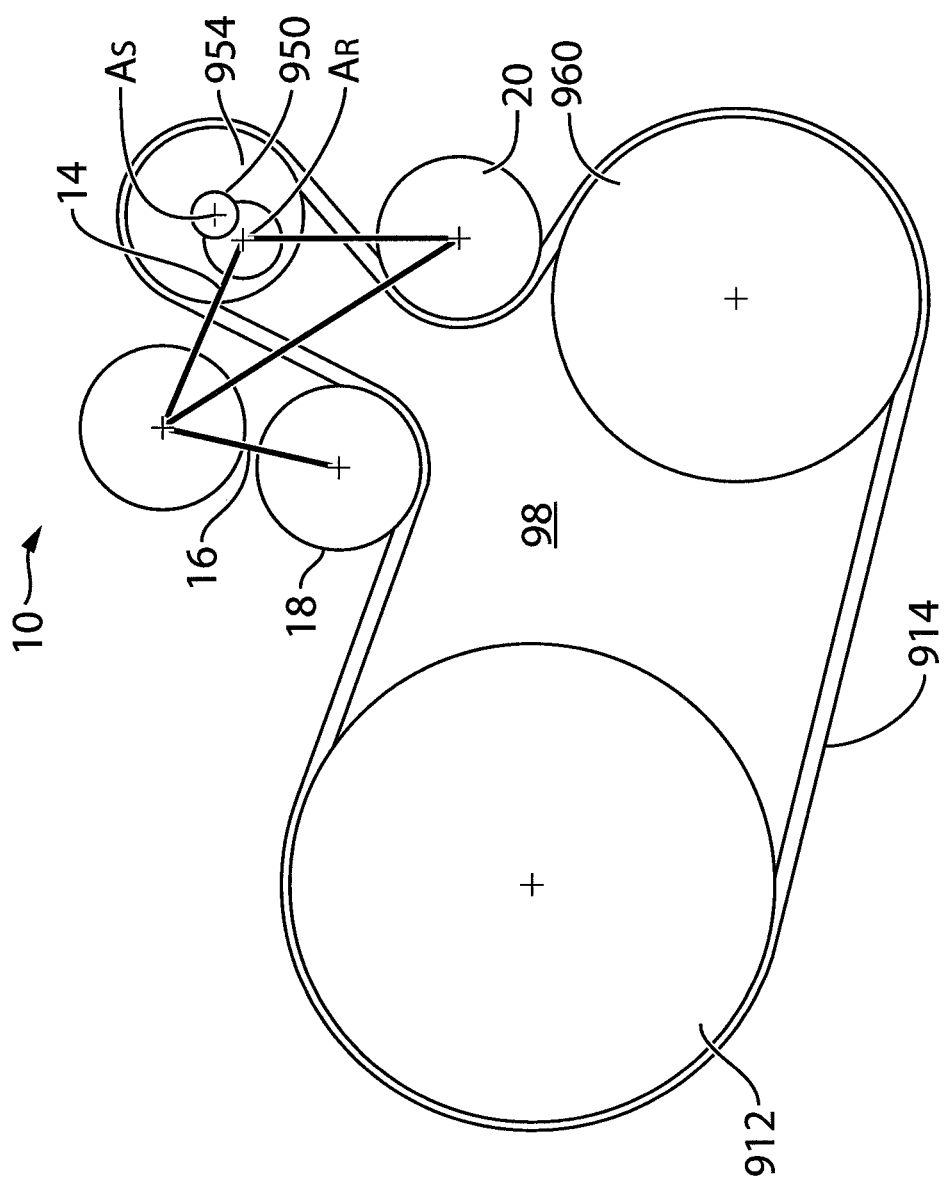

FIGS. 23 and 24 illustrate an engine layout similar to that shown in FIGS. 18-20, but where the ring axis $A_R$ is not co-axial with the axis $A_S$ of the MGU shaft. FIG. 23 illustrates a situation where the ring axis AR is 'inboard' of the shaft axis AS, while in FIG. 24 the ring axis AR is outboard of the shaft axis AS. The terms 'inboard' and 'outboard' are used here to indicate position relative to the region of the engine 913 that is contained within the belt 914 (shown at 98). While FIGS. 23 and 24 illustrate embodiments in which the ring axis AR is not coaxial with the shaft axis AS, it can be seen that the ring 14 still surrounds the shaft 950.

It will be understood that, in the embodiments shown herein, the tensioner arm 16 pivots about an arm pivot axis $A_A$ that is offset from the shaft axis $A_S$ of the MGU 916. This has several advantages. Firstly, under certain conditions, such as low frequency events such as a BAS starting event, the offset pivot axis of the tensioner arm 916 and the use of a ring 14 that can have a relatively high inertia and that moves along a relatively large diameter path can control the movement of the tensioner 10 so as to reduce the likelihood of slip. Embodiments that incorporate two tensioner arms 16 and 16' are advantageous in that they can more effectively filter out events (i.e. belt tension fluctuations that are higher frequency), while providing an additional degree of freedom of movement which is the ring 14.

It has been found during testing of a tensioner in accordance with the present disclosure that the average belt tension and the average hub loads are lower than with some other types of tensioner. This results in many advantages including: reduced fuel consumption during engine operation, reduced belt wear (and therefore increased belt life), and reduced loads (and therefore reduced wear) on the pulleys and bearings of the driven components such as for the air conditioning compressor, the water pump and the MGU itself. In particular, the reduced hub loads apply to embodiments with a single tensioner arm 16, where the ring 14 simply moves to a position to accommodate the belt tension acting on the first pulley 18 and the belt tension acting on the second pulley 20.

Another advantage of the embodiments described herein is that the tensioner 10 can be mounted to the MGU 916 to form a subassembly that can be installed in a vehicle relatively easily as compared to having an assembly line worker install the MGU, and then separately install a tensioner system. This can reduce the overall cost to manufacture the vehicle by some amount.

A suitable sealing member may be provided between any suitable members such as between the ring 14 and the base 12. The sealing member may be for example a skirt shield and/or one or more O-rings, a labyrinth seal or any other suitable type of seal to prevent the ingress of debris that could damage and/or jam the tensioner 10. Additionally, a suitable coating can be provided on the rotatable ring to inhibit heat buildup therein from friction and/or to promote heat dissipation.

Figure 25:
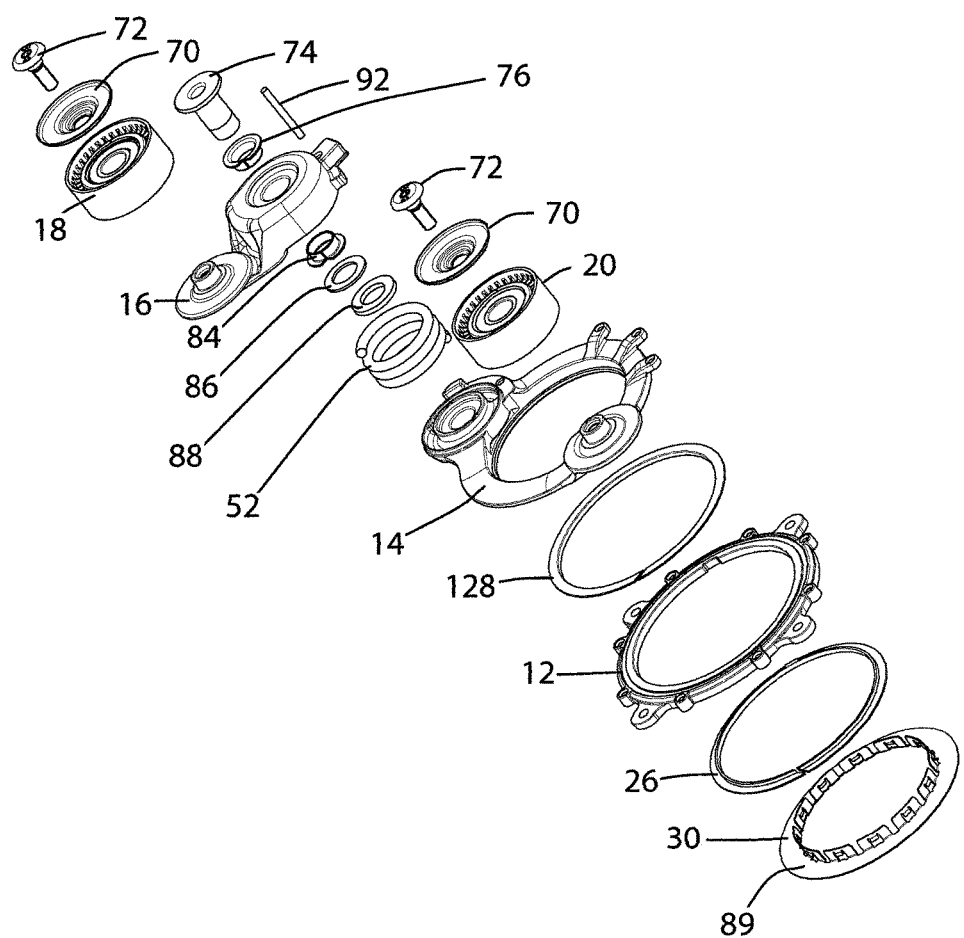
FIG. 25 is an exploded view of a tensioner in accordance with another embodiment of the disclosure.
Figure 26:
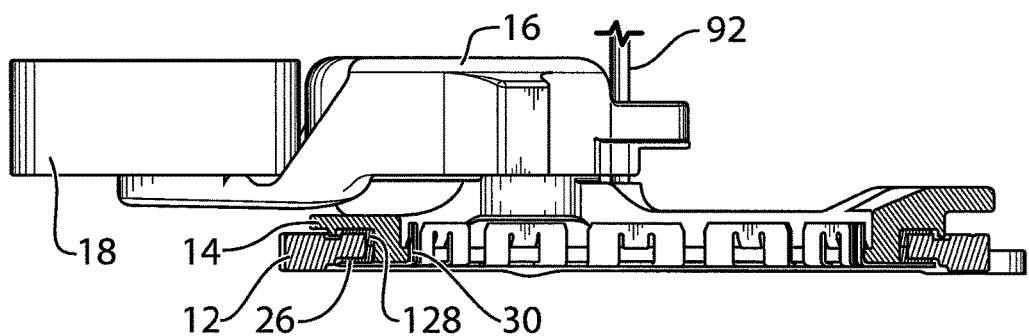
FIG. 26 is a sectional elevation view of the tensioner shown in FIG. 25.

Reference is made to FIGS. 25 and 26, which show an embodiment of the tensioner 10 that is similar to that which is shown in FIGS. 9-11, but with some additional modified features. The tensioner 10 in FIGS. 25-26 is configured to generally resist tilting forces that would otherwise cause uneven wear and eventual wobbling and failure of the tensioner 10. As can be seen in FIG. 25, the second ring bushing 128 is provided, which extends about the entire circumference of the ring 14 and the base 12 so as to provide improved stability of the ring 14 in terms of resistance to yaw, as noted above in relation to FIGS. 9-11.

Figure 27:
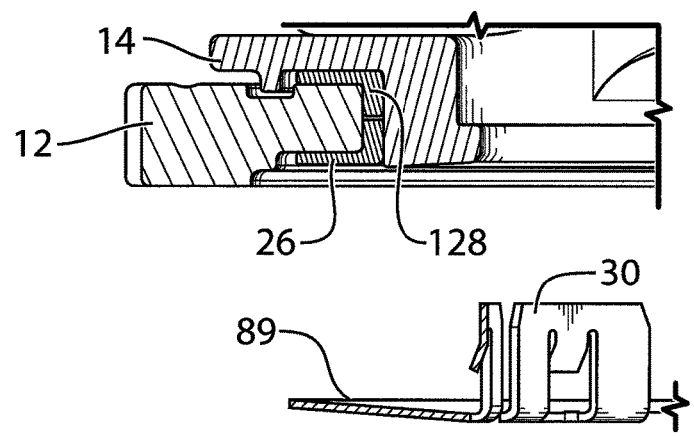
FIG. 27 is an exploded sectional elevation view of a portion of the tensioner shown in FIG. 25.
Figure 28:
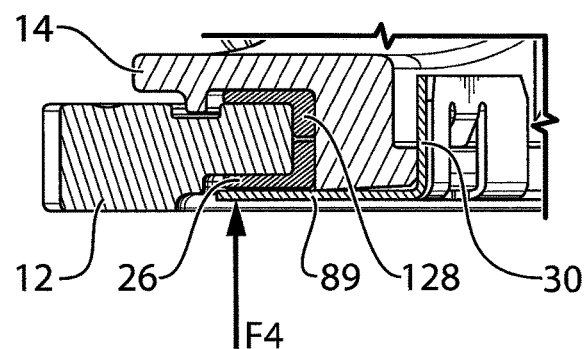
FIG. 28 is a non-exploded sectional elevation view of the portion of the tensioner shown in FIG. 27.

Additionally, as shown in FIG. 27, the flange 89 of the clamping member 30 has a selected upward cant in a rest position and is resilient. When the clamping member 30 is mounted to clamp the first and second ring bushings 26 and 128 (FIG. 28) the flange 89 is positioned to apply a selected force F4 on the bushings 26 and 128.

Figure 29:
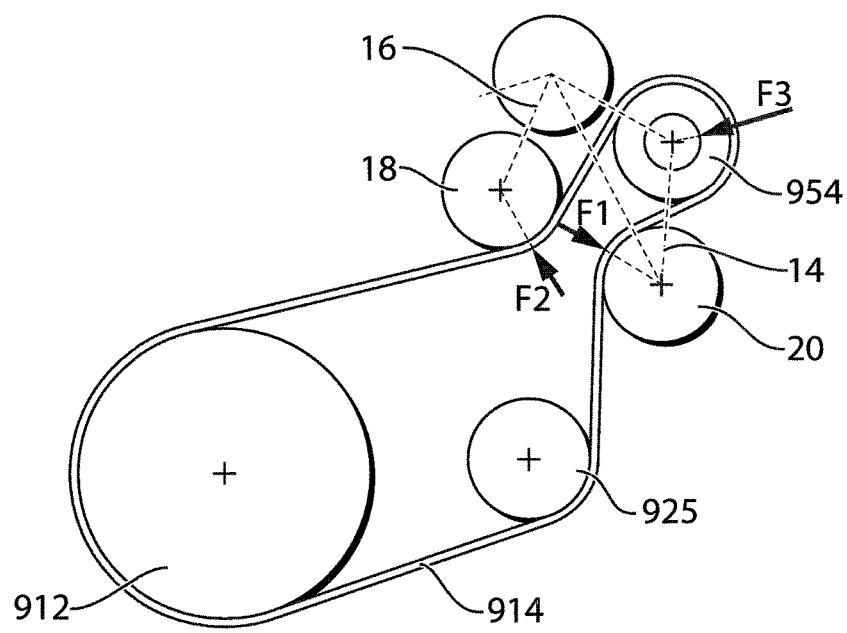
FIG. 29 is an engine layout illustrating the forces on the tensioner shown in FIG. 25.
Figure 30:
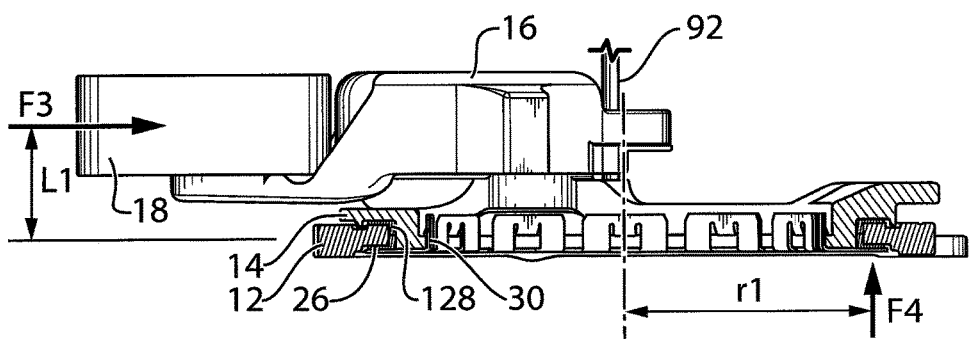
FIG. 30 is a sectional elevation view similar to FIG. 26, but showing forces acting on bushings supporting a ring of the tensioner.

Referring to FIG. 29, an engine layout is shown that includes the MGU pulley 954, the crankshaft pulley 912, the tensioner 10 and an idler 925. The forces acting in the plane shown in FIG. 29 include force F1 that acts on the tensioner arm pulley 18, force F2 that acts on the ring pulley 20, and the reaction force F3 that provides a net zero resultant force in the plane shown. The forces F1 and F2 are the result of the belt 914 acting on the pulleys 18 and 20. The force F3 is, however, out of plane relative to the bushing 26, and as a result, the force F3 generates a moment on the bushing 26, which is determined by the formula M1=F3*L1, where M1 is the moment generated by the force F3, and L1 is the distance between the vector axis of the force F3 and the vertical midpoint between the bushings 26 and 128. The force F4 generated by the flange 89 of the clamping member 30 generates a moment that opposes the moment M1. In order to ensure that there is no tilting of the bushing 26 in particular, the moment generated by the force F4 is to be greater than the moment M1. The moment generated by the force F4 is determined by the formula M2=F4*r1, where M2 is the moment generated by the force F4, and r1 is the radius at which the force F4 acts on the bushing 26. Thus by selecting suitable properties for the clamping member 30, the spring force F4 applied by the flange 89 may be selected to be sufficient to ensure that no tilting occurs in the bushing 26, so as to improve its operating life.

Instead of forming the flange 89 to apply a spring force on the bushing 26, it is alternatively possible to provide a separate spring member, such as a wave ring (not shown) that can apply an axially directed force on the bushing 26 to resist a tilting force.

Figure 31:
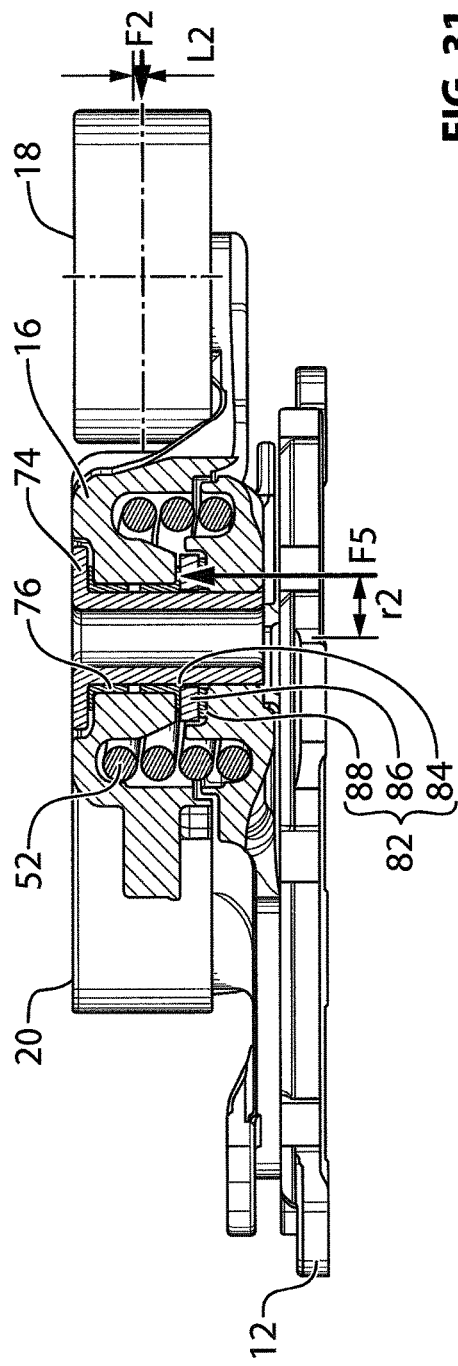
FIG. 31 is another sectional elevation view that shows forces acting on bushings supporting a tensioner arm from the tensioner shown in FIG. 25.

Reference is made to FIG. 31. As can be seen in FIG. 31, the damping member biasing member 88 may be configured to apply a force F5 on the bushing 84, wherein the force F5 is selected to ensure that there is no tilting force on the bushing 84 during operation of the tensioner 10. The force F2 acts on the bushing 84 to apply a moment determined by the formula M3=F2*L2, wherein the force moment M3 is the moment generated by the force F2, and the distance L2 is the distance from the vector axis of the force F2 to the vertical midpoint between the two bushings 76 and 84. To ensure that there is no net tilting force on the bushing 84, the moment generated by the force F5 is selected to be greater than the moment M3. The moment generated by the force F5 is determined by the formula M4=F5*r2, wherein the moment M4 is the moment generated by the force F5 and the distance r2 is the radius at which the force F5 acts on the bushing 84.

Figure 32:
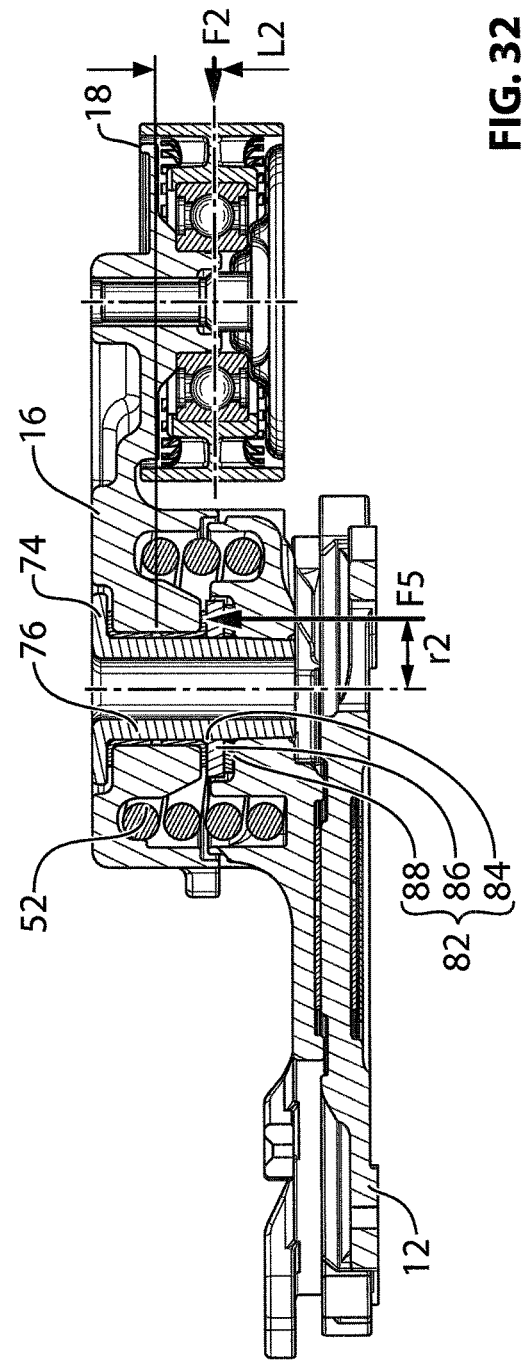
FIG. 32 is another sectional elevation view that shows forces acting on another portion of the tensioner shown in FIG. 25.

Reference is made to FIG. 32, which shows an alternative tensioner arm 16 that can be used instead of the arm 16 shown in FIGS. 25-31. The arm 16 shown in FIG. 32 is an arm-over-pulley configuration, in which the pulley 18 extends inwards towards the face of the alternator or MGU. The arm 16 shown in FIGS. 25-31 is an arm-under-pulley configuration, in which the pulley 18 extends outwards from the arm 16 (i.e. away from the alternator or MGU). Aside from a difference in the particular distances for L2 and r2 in FIG. 32 relative to FIG. 31, the selecting of force F5 to prevent a tilting force on the bushing 84 is substantially the same.

Based on the above description in relation to FIGS. 25-32, it can be seen that a force (i.e. force F4) generated by a spring member (e.g. the flange 89, or a wave ring) on a bushing (e.g. bushing 26) that supports the ring 14 on the base 12 can be selected to resist a tilting force (i.e. force F3) that results from the belt force on the pulleys 18 and 20 during operation of the tensioner. Additionally, it can be seen that a force (i.e. force F5) generated by another spring member (e.g. a Belleville washer 88) on a bushing (e.g. bushing 84) that supports the tensioner arm 16 can be selected to resist a tilting force (i.e. force F2) that results from the belt force on the tensioner arm pulley 18. The force F4 is selected depending at least in part on the force F3, the distance L1 and the radius r1, and the force F5 is selected depending at least in part on the force F2, the distance L2 and the radius r2.

Those skilled in the art will understand that a variety of other modifications may be effected to the embodiments described herein without departing from the scope of the appended claims.

The invention claimed is:

1. A tensioner for tensioning an endless drive member that is engaged with a rotary drive member on a shaft of a motive device, the tensioner comprising:
   a base that is mountable to the motive device;
   a ring that is rotatably supported by the base in surrounding relationship with the shaft of the motive device and which is rotatable about a ring axis;
   a tensioner arm pivotally mounted to the ring for pivotal movement about an arm pivot axis;
   a first tensioner pulley rotatably mounted to the tensioner arm, wherein the tensioner arm is biased towards a first span of the endless drive member on one side of the rotary drive member; and
   a second tensioner pulley that is rotatably mounted at least indirectly to the ring, wherein the second tensioner pulley is biased towards a second span of the endless drive member on another side of the rotary drive member,
   wherein the ring is rotatable in response to hub loads in the first and second tensioner pulleys that result from engagement with the first and second spans of the endless drive member,
   wherein a force generated by a spring member on a bushing that supports the ring on the base is selected to resist a tilting force that results from the belt force on the pulleys during operation of the tensioner.

2. A tensioner as claimed in claim 1, wherein the second tensioner pulley is an idler that is mounted to the ring for rotation about a second pulley pivot axis that is fixed relative to the ring.

3. A tensioner as claimed in claim 1, wherein the tensioner arm is biased in the free arm direction by a first biasing member which is a torsion spring.

4. A tensioner as claimed in claim 1, wherein the tensioner arm is biased towards the first span by a first biasing member which is a first helical compression spring action between the tensioner arm and the ring.

5. A tensioner as claimed in claim 1, wherein the tensioner arm is a first tensioner arm and the second tensioner pulley is mounted on a second tensioner arm that is biased towards the second span of the endless drive member.

6. A tensioner as claimed in claim 5, wherein the second tensioner arm is biased towards the second span by a second biasing member which is a second helical compression spring action between the second tensioner arm and the ring.

7. A tensioner as claimed in claim 1, further comprising a tensioner arm damping member positioned for damping movement of the tensioner arm.

8. A tensioner as claimed in claim 1, wherein a ring damping member is engaged with the ring to damping movement of the ring.

9. A tensioner as claimed in claim 8, wherein the ring damping member is configured to dampen movement of the ring more strongly in a first rotational direction of the ring than in a second rotational direction of the ring.

10. A tensioner as claimed in claim 8, wherein the ring damping member is a first ring damping member that is positioned between the ring and the base and engages a first face of the base, and wherein a second ring damping member is connected to the ring and engages a second face of the base.

11. A tensioner as claimed in claim 10, further comprising a clamping member that is connected to the ring such that the clamping member cooperates with the ring to clamp the base and the first and second ring damping members while still permitting sliding movement of the ring relative to the base.

12. A tensioner as claimed in claim 11, wherein the clamping member is threadably connected to the ring so as to permit adjustment of a gap between a clamping member face and a ring race so as to permit adjustment of a damping force exerted on the ring via the first and second ring damping members.

13. A tensioner as claimed in claim 1, further comprising an arm locking member configured to lock the tensioner arm in a selected angular position relative to the ring, such that the tensioner arm permits installation of the endless drive member around the first and second tensioner pulleys and the rotary drive member.

14. A tensioner as claimed in claim 1, wherein the ring axis is coaxial with an axis of the shaft of the motive device.

15. A tensioner as claimed in claim 1, wherein the ring axis is offset from an axis of the shaft of the motive device.

16. A tensioner as claimed in claim 1, wherein a force generated by another spring member on a bushing that supports the tensioner arm is selected to resist a tilting force that results from the belt force on the tensioner arm pulley.

* * * * *